(12) United States Patent
Pease et al.

(10) Patent No.: US 12,544,799 B2
(45) Date of Patent: Feb. 10, 2026

(54) SEPARATOR ASSEMBLIES AND METHODS

(71) Applicant: Battelle Memorial Institute, Richland, WA (US)

(72) Inventors: Leonard F. Pease, Richland, WA (US); Xiao-Ying Yu, Richland, WA (US); Timothy G. Veldman, Kennewick, WA (US); Matthew S. Fountain, Kennewick, WA (US); Michael J. Minette, Kennewick, WA (US); Carolyn A. Burns, Richland, WA (US); Nathan R. Phillips, Kennewick, WA (US); Jason E. Serkowski, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/395,097

(22) Filed: Apr. 25, 2019

(65) Prior Publication Data
US 2020/0306798 A1    Oct. 1, 2020

Related U.S. Application Data

(60) Provisional application No. 62/832,790, filed on Apr. 11, 2019, provisional application No. 62/824,925, filed on Mar. 27, 2019.

(51) Int. Cl.
*B07C 5/36* (2006.01)
*B07C 5/06* (2006.01)
(Continued)

(52) U.S. Cl.
CPC ............. *B07C 5/36* (2013.01); *B07C 5/06* (2013.01); *B65G 53/60* (2013.01); *C02F 1/004* (2013.01);
(Continued)

(58) Field of Classification Search
CPC .. B07C 5/36; B07C 5/06; B65G 53/60; C02F 1/004; C02F 2103/34; C02F 2301/022; C02F 2302/24
(Continued)

(56) References Cited

U.S. PATENT DOCUMENTS

| 3,240,336 A | 3/1966 | Condolios |
| 4,818,375 A | 4/1989 | Dorph |

(Continued)

FOREIGN PATENT DOCUMENTS

| CN | 202983295 | 6/2023 |
| GB | 2150039 | 6/1985 |

(Continued)

OTHER PUBLICATIONS

D'Avino, "Non-Newtonian Deterministic Lateral Displacement Separator: Theory and Simulations", Rheologica Acta vol. 52, 2013, Germany, pp. 221-236.

(Continued)

*Primary Examiner* — Molly K Devine
(74) *Attorney, Agent, or Firm* — Wells St. John P.S.

(57) ABSTRACT

Mesofluidic separator assemblies are provided that can include at least a pair of supports configured to extend within a pressure differential axis, and at least one level of a plurality of members extending between the pair of supports. Individual members of the plurality can define a plurality of levels extending from a first level configured to have initial contact with the fluid to be separated and a last level configured to have final contact with the fluid to be separated. Sets of members can be aligned along one axis that is neither parallel nor normal to the pressure differential axis. Conduits configured to facilitate the flow of fluid along the pressure differential axis can define at least one cross (Continued)

sectional area that is open. Methods for size separating particles within a fluid are also provided.

14 Claims, 37 Drawing Sheets

(51) Int. Cl.
    *B65G 53/60*     (2006.01)
    *C02F 1/00*     (2023.01)
    *C02F 103/34*     (2006.01)

(52) U.S. Cl.
    CPC .... *C02F 2103/34* (2013.01); *C02F 2301/022* (2013.01); *C02F 2303/24* (2013.01)

(58) Field of Classification Search
    USPC ....................................................... 209/552
    See application file for complete search history.

(56) References Cited

U.S. PATENT DOCUMENTS

| | | | |
|---|---|---|---|
| 5,817,505 A | 10/1998 | Thompson et al. | |
| 5,947,299 A | 9/1999 | Vazquez et al. | |
| 6,010,554 A | 1/2000 | Birmingham et al. | |
| 6,814,241 B1 | 11/2004 | Galvin | |
| 7,735,652 B2* | 6/2010 | Inglis ................ | B01L 3/502761 |
| | | | 209/155 |
| 8,186,913 B2 | 5/2012 | Toner et al. | |
| 8,579,117 B2* | 11/2013 | Loutherback ............ | B03B 5/00 |
| | | | 209/210 |
| 8,906,322 B2* | 12/2014 | Huang ...................... | B07B 1/00 |
| | | | 422/503 |
| 8,921,102 B2* | 12/2014 | Fuchs ............... | B01L 3/502707 |
| | | | 435/325 |
| 9,500,051 B2 | 11/2016 | Hall | |
| 9,597,692 B2 | 3/2017 | Bernate et al. | |
| 10,413,848 B2 | 9/2019 | Xu | |
| 10,576,399 B2 | 3/2020 | Kompala | |
| 11,028,359 B2 | 6/2021 | Misner et al. | |
| 11,090,583 B2 | 8/2021 | Hammerschmidt et al. | |
| 11,406,918 B2 | 8/2022 | Alba et al. | |
| 11,491,418 B2 | 11/2022 | Less et al. | |
| 2009/0032448 A1 | 2/2009 | Kolb | |
| 2010/0006479 A1* | 1/2010 | Reichenbach .... | B01L 3/502746 |
| | | | 209/132 |
| 2010/0243539 A1 | 9/2010 | Kojima et al. | |
| 2012/0006728 A1 | 1/2012 | Huang et al. | |
| 2012/0037544 A1* | 2/2012 | Lane .................. | B01D 21/0042 |
| | | | 209/156 |
| 2013/0023397 A1 | 1/2013 | Galvin | |
| 2013/0168298 A1 | 7/2013 | Huang et al. | |
| 2015/0328566 A1 | 11/2015 | Oosthuizen | |
| 2020/0001217 A1 | 1/2020 | Savage | |
| 2021/0317009 A1 | 10/2021 | Galvin | |
| 2024/0360005 A1 | 10/2024 | Pease et al. | |

FOREIGN PATENT DOCUMENTS

| | | |
|---|---|---|
| GB | 2170419 | 8/1996 |
| JP | 2014000547 | 1/2014 |
| WO | WO WO 1991/006627 | 5/1991 |
| WO | WO PCT/US2020/025063 | 10/2021 |
| WO | WO WO 2022/067408 | 4/2022 |
| WO | WO WO 2023/066218 | 4/2023 |
| WO | WO PCT/US2024/026794 | 6/2024 |
| WO | WO PCT/US2024/026871 | 8/2024 |

OTHER PUBLICATIONS

Daniel et al., "EFRT M-12 Issue Resolution: Comparison of Filter Performance at PEP and CUF Scale", Pacific Northwest National Laboratory WTP-RPT-185, 2009, United States, 148 pages.
Davis et al., "Deterministic Hydrodynamics: Taking Blood Apart", Proceedings of the National Academy of Science vol. 103, 2006, United States, pp. 14779-14784.
Dijkshoorn et al., "A Comparison of Microfiltration and Inertia-based Microfluidics for Large Scale Suspension Separation", Separation and Purification Technology vol. 173, 2017, United Kingdom, pp. 86-92.
Dijkshoorn et al., "Deterministic Displacement of Particles and Oil Droplets in a Cross-Flow Microsieve Module", Journal of Membrane Science vol. 566, 2018, Netherlands, pp. 435-441.
Dijkshoorn et al., "Reducing the Critical Particle Diameter in (highly) Asymmetric Sieve-based Lateral Displacement Devices", Scientific Reports, 2017, United Kingdom, 10 pages.
Dijkshoorn et al., "Sieve-based Lateral Displacement Technology for Suspension Separation", Separation and Purification Technology vol. 175, 2017, United Kingdom, pp. 384-390.
Dincau et al., "Deterministic Lateral Displacement (DLD) in the High Reynolds Number Regime: High-Throughput and Dynamic Separation Characteristics", Microfluidics and Nanofluidics vol. 22, 2018, Germany, 59.
Dincau et al., "Vortex-Free High-Reynolds Deterministic Lateral Displacement (DLD) via Airfoil Pillars", Microfluidics and Nanofluidics vol. 22, 2018, Germany, 137.
Geeting et al., "Filtration of Hanford Tank AP-107 Supernatant", Pacific Northwest National Laboratory PNNL-27638, 2018, United States, 76 pages.
Golcar, "Performance of Tubular Porous Metal Crossflow Filters", Pacific Northwest Laboratory PNWD-3216, WTP-RPT-019, 2002, United States, 88 pages.
Holm, et al., "Separation of Parasites from Human Blood using Deterministic Lateral Displacement", Lab on a Chip vol. 11, 2011, United Kingdom, pp. 1326-1332.
Huang et al., "Continuous Particle Separation Through Deterministic Lateral Displacement", Science vol. 304, 2004, United States, pp. 987-990.
Inglis et al., "Critical Particle Size for Fractionation by Deterministic Lateral Displacement", Lab on a Chip vol. 6, 2006, United Kingdom, pp. 655-658.
Jacob et al., "Particle Dispersion in Porous Media: Differentiating Effects of Geometry and Fluid Rheology", Physical Review E vol. 96, 2017, United States, 13 pages.
Kabacaoglu et al., "Optimal Design of Deterministic Lateral Displacement Device for Viscosity Contrast Based Cell Sorting", Physical Review Fluids vol. 3, 2018, United States.
Kabacaoglu et al., "Sorting Same-Size Red Blood Cells in Deep Deterministic Lateral Displacement Devices", Journal of Fluid Mechanics vol. 859, 2019, United Kingdom, pp. 433-475.
Li et al., "Dynamic Control of Particle Separation in Deterministic Lateral Displacement Separator with Viscoelastic Fluids", Scientific Reports, 2018, United Kingdom, 9 pages.
Loutherback et al., "Deterministic Microfluidic Ratchet", Physical Review Letters vol. 102, 2009, United States, 4 pages.
Lubbersen et al., "Suspension Separation with Deterministic Ratchets at Moderate Reynolds Numbers", Chemical Engineering Science vol. 73, 2012, United Kingdom, pp. 314-320.
Lubbersen et al., "Visualization of Inertial Flow in Deterministic Ratchets", Separation and Purification Technology vol. 109, 2013, United Kingdom, pp. 33-39.
Ranjan et al., "DLD Pillar Shape Design for Efficient Separation of Spherical and Non-Spherical Bioparticles", Lab on a Chip vol. 14, 2014, United Kingdom, pp. 4250-4262.
Zeming et al., "Rotational Separation of Non-Spherical Bioparticles using I-Shaped Pillar Arrays in a Microfluidic Device", Nature Communications vol. 4, 2013, United Kingdom, 8 pages.
Acrivos et al., "Enhanced sedimentation in settling tanks with inclined walls", Journal of Fluid Mechanics 92 (1979), United Kingdom, pp. 435-457.

(56) References Cited

OTHER PUBLICATIONS

Boycott, "Sedimentation of Blood Corpuscles", Nature 104 (1920) United Kingdom, 532, 1 page.

Burns et al., "Mesofluidic Separation versus Dead-end Filtration" Separation and Purification Technology 254 (2021) The Netherlands, 117256, 7 pages.

H2K Technologies, Inc., "IPC Series DAF & Inclined Plate Clarifiers", available online at https://www.h2ktech.com/wp-content/uploads/2020/02/IPC_Series_Inclined_Plate_Clarifiers.pdf, 2011, 3 pages.

Kong et al., "Lab-on-a-CD: A fully Integrated Molecular Diagnostic System", Journal of Laboratory Automation 21 (2016) United States, pp. 323-355.

Minette et al., "Targeted Particle Fractionation Technologies: Proof of Concept" Proceedings of the ASME 2023, Paper No. IMECE2023-110684, published online Feb. 5, 2024, United States, 7 pages.

Xu et al., "A Numerical Simulation of the Boycott Effect", Chem. Eng. Comm, 192 (2005) United Kingdom pp. 532-549.

Peacock et al., "The stratified Boycott effect", J. Fluid Mech. vol. 529 (2005) United Kingdom, pp. 33-49.

Baranets et al., "Mathematical Modeling of Particle Aggregation and Sedimentation in the Inclined Tubes", Mathematics, Applied Mathematics and Mechanics, vol. 90, 2019, Netherlands, pp. 42-59.

Cerny et al., "The Sedimentation Potential and the Boycott Effect", Biorheology, vol. 25, 1988, United States, pp. 503-516.

Hill et al., "Boundary-Enhanced Sedimentation Due to Settling Convection", Int. J. Multiphase Flow, vol. 3, 1977, Great Britain, pp. 561-583.

Kapoor et al., "Sedimentation and sediment flow in settling tanks with inclined walls", Journal of Fluid Mechanics, vol. 290 (1995), United Kingdom, pp. 39-66.

Kim et al., "Geometry effects on blood separation rate on a rotating disc", Sensors and Actuators B, 178, 2013, Netherlands, pp. 648-655.

Kinahan et al., "Spira mirabilis enhanced whole blood processing in a lab-on-a-disk", Sensors and Actuators A, 215, 2014, Netherlands, pp. 71-76.

Leighton et al., "The shear-induced migration of particles in concentrated suspensions", Journal of Fluid Mechanics, vol. 181 (1987), United Kingdom, pp. 415-439.

Leung et al., "Lamella and Tube Settlers. 1. Model and Operation", Ind. Eng. Chem. Process Des. Dev. vol. 22, No. 1 (1983) pp. 58-67.

Nir et al., "Sedimentation and sediment flow on inclined surfaces", Journal of Fluid Mechanics, vol. 212 (1990) United Kingdom, pp. 139-153.

Palma et al., "Characterization of a sediment layer of concentrated fluid-solid mixtures in tilted ducts at low Reynolds Numbers", Powder Technology 325 (2018) Netherlands, pp. 192-201.

Pease et al., "Industrial scale mesofluidic particle separation", Chemical Engineering & Processing: Process Intensification 173 (2022) 108795, Netherlands, 7 pages.

Reyes et al., "A Review on Steeply Inclined Settlers for Water Clarification", https://arxiv.org/pdf/2212.10394v1; Dec. 21, 2022, United States, 37 pages.

Schaflinger, "Centrifugal separation of a mixture", Fluid Dynamics Research vol. 6, 1990, United Kingdom, pp. 213-249.

Smith et al., "Particle concentration using inclined sedimentation via sludge accumulation and removal for algae harvesting", Chemical Engineering Science vol. 91 (2013) United Kingdom, pp. 79-85.

Spearman et al., "On the hindered settling of sand-mud suspensions", Ocean Dynamics vol. 67 (2017) Germany, pp. 465-483.

Tripathi et al., "A new criterion for the continuous operation of supersettlers in the bottom-feeding mode", Int. J. Multiphase Flow, vol. 22, No. 2 (1996) United Kingdom, pp. 353-361.

Wiberg et al., "Calculations of the Critical Shear Stress for Motion of Uniform and Heterogeneous Sediments", Water Resources Research, vol. 23, No. 8 (1987) United States, pp. 1471-1480.

Reyes et al., "Heat-Assisted Batch Settling of Mineral Suspensions in Inclined Containers." Minerals 9, No. 4 (2019) 228; Switzerland, 19 pages.

\* cited by examiner

SEPARATOR ASSEMBLIES AND METHODS

CROSS REFERENCE TO RELATED APPLICATION

This application claims priority to and the benefit of U.S. Provisional Patent Application Ser. No. 62/824,925 filed Mar. 27, 2019, entitled "Solid Particle Filtration Apparatuses and Methods" and U.S. Provisional Patent Application Ser. No. 62/832,790 filed Apr. 11, 2019, entitled "Separator Assemblies and Methods", the entirety of each of which is incorporated by reference herein.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to separator assemblies and methods. Particular embodiments of the disclosure are directed to mesofluidic separator assemblies and methods.

BACKGROUND

Slurries play an important role in modern industrial processing, from food processing and hydraulic fracturing to mineral processing, waste treatment, vegetable processing, water purification, and/or nuclear waste processing. Conditioning slurries to meet product, process, and regulatory requirements is an important industrial technique. Engineering is challenged particularly as concentrations rise to process intensification.

Filtration is an industrially important unit operation used on every continent across a broad range of at least these industries. In each application, particles (broadly defined) larger than a cutoff must be removed to produce a filtrate devoid of large particles. In dead-end filtration with a single inlet and a single outlet, particles larger than the characteristic channel dimension are trapped on the filter inlet to form a filter cake.

Every major industry is intensifying its processes as rapidly as technology, market economics, and available investment allow, because higher flow rates and higher concentrations typically lead to lower cost of goods sold (COGS), higher profit margins, and more compelling returns on investment. However, in several industries filtration technology limits process intensification, because both higher concentrations and faster flow rates lead to faster cake and depth fouling, leaving filtration unit operations as perineal bottlenecks.

Additionally, filter banks often have a significant footprint as they increase cross-sectional area to match flow rate requirements, but smaller footprint systems minimize the cost of implementation. Therefore, minimizing the filtration footprint is also desirable.

Therefore, novel filtration approaches amenable to process intensification remain desirable. The present disclosure provides separator assemblies and methods that overcome shortcomings of the prior art.

SUMMARY

Mesofluidic separator assemblies are provided that can include at least a pair of supports configured to extend lengthwise within a pressure differential axis, and at least one level of a plurality of members extending between the pair of supports.

Mesofluidic separator assemblies are also provided that can include a plurality of members configured to extend substantially normal to a pressure differential axis, and at least individual members of the plurality defining a plurality of levels extending from a first level configured to have initial contact with the fluid to be filtered and a last level configured to have final contact with the fluid to be filtered.

Additional mesofluidic separator assemblies are also provided that can include at least one set of a plurality of members with a length of each individual member being configured to extend substantially normal to a pressure differential axis and each member in the one set being aligned along one axis that is neither parallel nor normal to the pressure differential axis.

Additionally, mesofluidic separator assemblies are provided that can include a conduit configured to facilitate the flow of fluid along a pressure differential axis with the conduit defining at least one cross sectional area. The mesofluidic separator assembly can also include a separator assembly within the conduit and occupying one portion of the at least one cross sectional area while another portion of the at least one cross sectional area is open.

Methods for size separating particles within a fluid are provided. The methods can include providing a fluid having solid particles of at least two sizes into a conduit having a plurality of members, and arranging the members to direct the smaller of the two sized particles through the plurality of members while maintaining a substantially linear path and to direct the larger of the two sized particles through the plurality of members in a substantially non-linear path.

DRAWINGS

Embodiments of the disclosure are described below with reference to the following accompanying drawings.

DESCRIPTION

Figure 1A:
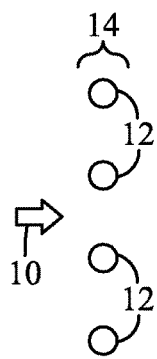
FIGS. 1A-1C are depictions of embodiments of levels of members according to an embodiment of the disclosure.

This disclosure is submitted in furtherance of the constitutional purposes of the U.S. Patent Laws "to promote the progress of science and useful arts" (Article 1, Section 8).

Embodiments of the mesofluidic separation systems of the present disclosure do not cake or depth foul. Implementations of these systems are flow-through systems that maintain large void volumes within arrays of members that in combination perform the particle separation. Mesofluidic refers to the systems or devices that leverage microfluidic principles (e.g., numbering up instead of scaling up) but operate at industrial scale flow rates (e.g., gallons per hour in contrast to milliliters per hour). In mesofluidic separation small particles weave around arrays of members. In contrast, large particles bump consecutively to one side of members with each row of members offset by a fixed amount that is related through fluidic mechanics to the cutoff between large and small particles. In this manner, small particles simply pass from entrance to exit but large particles migrate toward one side.

At the end of the array, the larger stream of particles can be collected separately from the remainder of the flow. This larger particle stream can be considered a retentate and the remainder of the fluid can be considered the filtrate or permeate. These systems may perform at feed flow rates of 1-100 gpm enclosed between supports. Substantially higher flow rates are also contemplated.

Fast flow rates in mesofluidic separation systems is important to a variety of industrial applications. One example is nuclear waste processing. For example, radioactive tank waste slated to be converted into glass in vitrification plants for high level waste (HLW) and low activity waste (LAW). The Hanford Waste Treatment and Immobilization Plant (WTP) Pretreatment Facility (PTF) is designed to separate the waste for the two plants by removing radioactive particles using filtration and the soluble radioactive Cs using ion exchange. The stream devoid of or dilute in particles and Cs is to be processed in the LAW vitrification plant and the remainder is slated for the HLW vitrification plant. Some enhancement in throughput may be gained by arraying mesofluidic separators within the inner diameter of a pipe. In nuclear operations involving the transportation of fissile particles, linear pipe sections are typically limited to three inches or less to prevent nuclear criticality. Even with increases in cross sectional area relative to the parallel plate systems, exploration at higher flow rates is necessary to evaluate the potential throughput of mesofluidic filtration systems for these applications. Flow rates up to and exceeding 90 gpm can be achieved with a smaller footprint within a pipe three inches in diameter for example.

Another example of the need for fast flow rates in mesofluidic separation systems is in the petroleum industry. The hydraulic fracturing process in the petroleum industry uses about 4.2 million pounds of proppant sand per well. When the pressure is removed for the well (at the end of fracturing) a mixture of drilling muds, petroleum products, hole cuttings, and around a 1 million pounds of proppant sand flow out of the well at a high rate of flow. The mesofluidic separator could be placed in the existing piping structure and would be able to separate the proppant sands from the drilling muds, hole cuttings and a majority of the liquids so they could be used in future well drilling. This would allow much faster turnaround of the proppant sand when compared to the current settling pond approach and would better separate the proppant sand from the drilling muds (clays) and the hole cuttings.

An emerging need for mesofluidic separation is in the recycle of particles for advanced manufacturing and metal 3D printing. The print process may leave very small metal particles and partially agglomerated particles in addition to the desired particles. A two stage mesofluidic separation process may be used with the first stage removing the partially agglomerated particles and the second stage removing the very small metal particles that are less useful. In this manner, a stream of particles of the desired size range may be produced.

Particulate removal from gas streams can employ technologies such as cyclones, granular beds, scrubbers, and fabric filters for a variety of reasons including protection of downstream processes, environmental protection, and worker safety. These technologies all have limitations relating to particle size separation, flow rate, operating temperature and pressures, and maintenance for cleaning filter cake formation or depth fouling. Embodiments of the mesofluidic separators of the present disclosure can be tailored for desired particle size segregation, have minimal pressure drop, and/or require little to no periodic cleaning to return to or maintain original performance. The separators can be configured to partition particles in pneumatic conveyance and/or from fluidized beds.

Figure 1B:
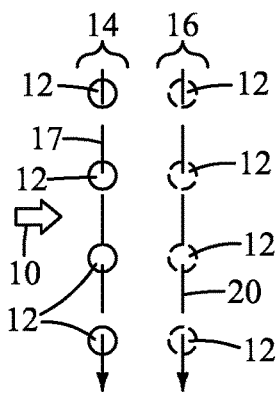
Figure 1C:
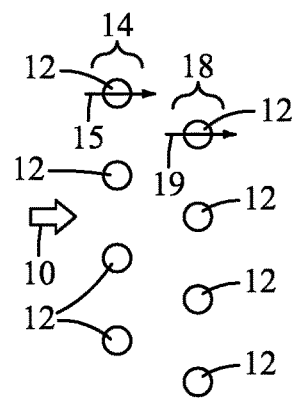

The separator assemblies and methods of the present disclosure will be described with reference to FIGS. 1A-36. Referring first to FIGS. 1A-1C, a portion of a mesofluidic separator assembly is shown in cross sectional view that includes at least a pair of supports, not shown at this point, configured to extend lengthwise and within a pressure differential axis 10. Pressure differential axis 10 is the orientation of fluid direction proceeding to the intake of a separator assembly and then proceeding away via the outtake of a separator assembly. This pressure differential axis can be considered a linear axis for the entirety of the fluid as it typically is conveyed via a conduit and/or through separator assemblies of the present disclosure. The axis may become spiral as fluid progresses between assemblies as supports spiral, but within an assembly the fluid progresses linearly while particles within the fluid can progress nonlinearly. The pressure differential axis can be facilitated by allowing fluid to migrate via gravity or by providing a pressure differential either at the front of a conduit or the rear portion of a conduit. Accordingly, a pressure differential can be established by pumping or providing pressure to a head or by withdrawing or providing pressure in the form of a vacuum. The supports can be linear or curved and may take the form of a spiral for example in the form of wire supported members. Further, the supports can be considered the sidewalls of the assembly such as inner sidewalls of a conduit through which the pressure differential axis proceeds. In all instances, the fluids discussed here can include both liquid and gas phase fluid as well as supercritical fluids.

With reference to FIGS. 1A-1B, a plurality of members 12 are shown in cross section. As depicted, the members are substantially circular in cross section. However, other cross sections are contemplated, including planar or even semiplanar, as well as nonsymmetrical cross sections. Further, members can have different diameters in at least one cross section. As shown in most of the examples, the cross sectional diameters are substantially the same, but this is not necessary. Additionally, the members are depicted and shown as straight, however additional embodiments can include curved or bent members. The members and/or supports may be coated with a material as well.

With reference to FIG. 1A, one level of these members 12 can be represented as 14 and with respect to FIG. 1B, a second level of members 12 can be represented as 16. Referring to FIG. 1B, the second level 16 of members 12 can be oriented wherein at least a pair of members 12 are located lateral to one another. Referring to FIG. 1C, another level 18 of members 12 is shown wherein each of the members 12 is not lateral to but juxtaposed to a lateral level 14 of members 12. Accordingly, the members of another level such as 18 are juxtaposed in relation to alignment with the other level 14. As can be seen in FIGS. 1A-1C, subsequent levels can be spaced apart from other levels, and levels can be located at different points along the pressure differential axis 10. Accordingly, subsequent other levels such as 18 in relation to 14 or 16 in relation to 14 can be distal to the one level. Referring to FIG. 1C, accordingly, each of the members 12 can be arranged along an axis in relation to the pressure differential axis. For example, members 12 within level 14 can be arranged along an axis 15 while members 12 within another level such as level 18 can be arranged along an axis 19. These axes can be different axes in relation to one another. Additionally, the levels can be arranged along axes that are normal to pressure differential axis 10. Accordingly, axes 17 and 20 can be parallel to one another, however, both normal to the pressure differential axis 10. In accordance with example implementations, there can be a plurality of these levels in the separator assembly of the present disclosure.

Figure 2A:
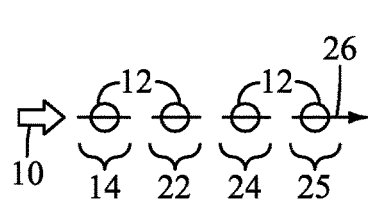
FIGS. 2A-2C are depictions of sets of pluralities of members according to embodiments of the disclosure.
Figure 2B:
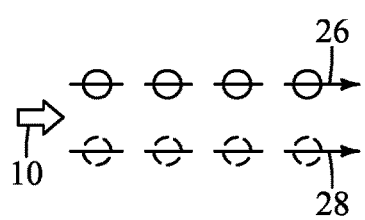
Figure 2C:
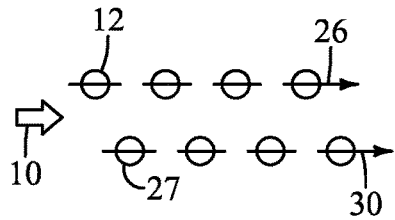

Referring next to FIGS. 2A-2C, a plurality of members 12 can be configured to extend lengthwise substantially normal to a pressure differential axis. Individual ones of these members can define individual levels extending from a first level such as 14 to another level or second level 22 to another level or third level 24 and even another level such as fourth level 25. In accordance with example implementations, first level 14 can be configured to have initial contact with the fluid to be filtered while last level 25 may have final contact with the fluid to be filtered. The number of these levels is not restrained by the numbers depicted here, as a plurality of levels are contemplated. In accordance with example implementations, at least one set of individual members can be aligned along an axis such as axis 26, and this axis can be substantially parallel to the pressure differential axis. Another set of members can be aligned along another axis such as axis 28, and both of these axes may be substantially parallel with the pressure differential axis 10. In accordance with example implementations and with reference to FIG. 2C, the relationship of the members can be juxtaposed in relation to one another as shown in FIG. 2C, wherein one set of members 27 is juxtaposed in relation to the other set of members 12. In accordance with example implementations, one set of these members can reside at an edge of the separator and be exposed to an open portion of the separator assembly.

Figure 3A:
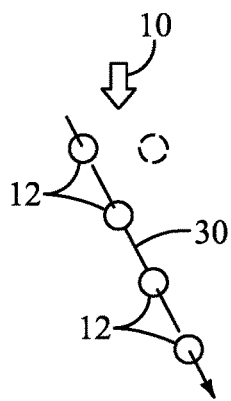
FIGS. 3A-3C depict additional sets of pluralities of members arranged in relation to the pressure differential axis according to embodiments of the disclosure.
Figure 3B:
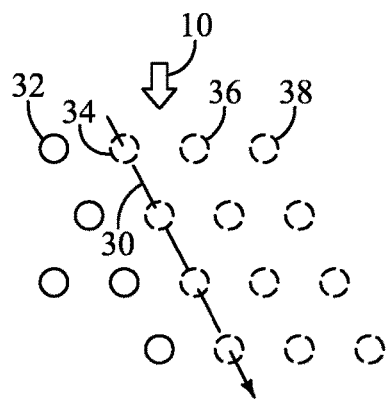
Figure 3C:
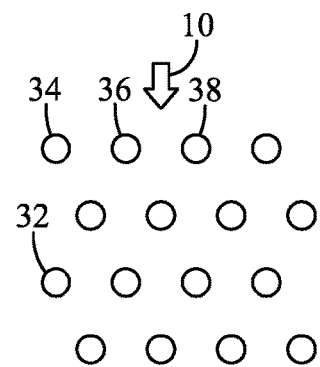

Referring next to FIGS. 3A-3C, portions of separator assemblies are shown with a pressure differential axis 10 in relation to members 12. These members 12 can be aligned along an axis 30 that is neither normal to nor parallel with pressure differential axis 10 as shown. As shown in FIGS. 3B and 3C, there can be additional sets of these members in the separator assembly. These sets are shown as set 32, 34, 36, and 38, each being aligned along an axis that is neither normal to nor parallel with the pressure differential axis. Referring to FIG. 3C, as the members are associated with edges of the separator system, there may be portions of these sets that are removed from the separator assembly. As shown, there is a portion of set 32 that is removed, while sets 34, 36, and 38 remain intact. As can be seen, at least one set of members can be distal to another set of members along the pressure differential axis. In accordance with example implementations and as will be discussed shortly, specific particles can proceed substantially along the non-parallel or normal axis.

Figure 4:
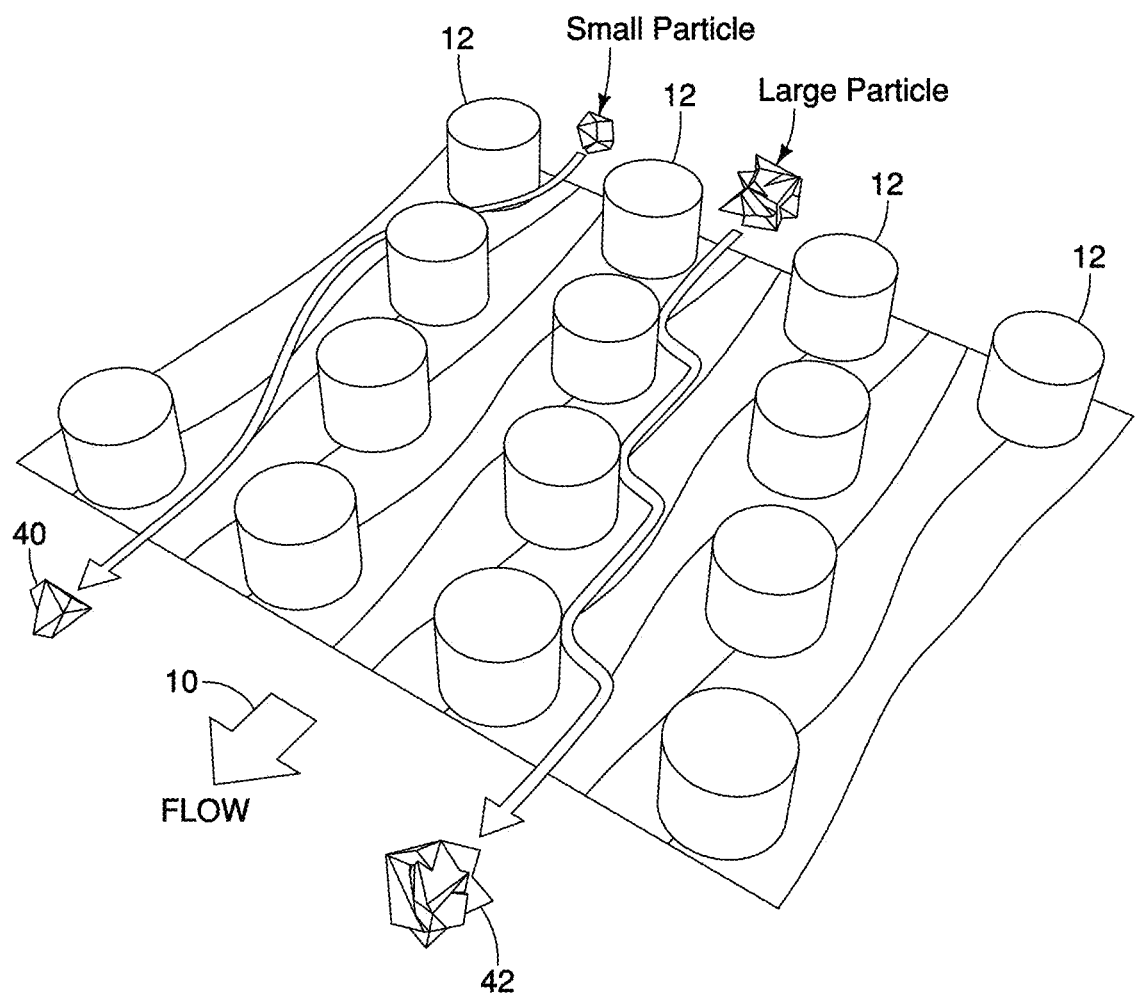
FIG. 4 is a depiction of a separator assembly according to an embodiment of the disclosure.
Figure 5:
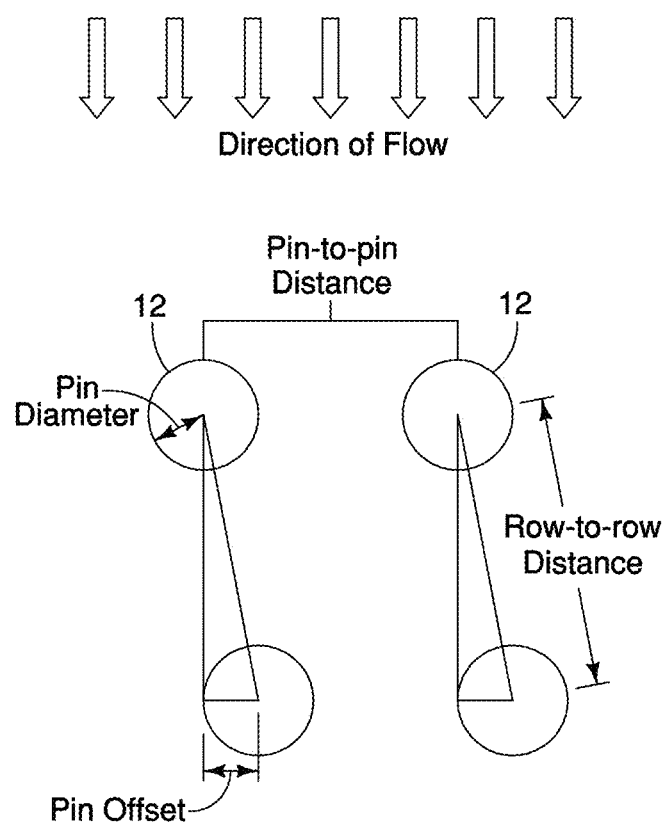
FIG. 5 is a depiction of the relationship of members within a separator assembly according to an embodiment of the disclosure.

Referring to FIG. 4, a separator assembly is shown that includes members 12. This separator assembly is shown with a pressure differential axis 10 as well as particles of varying size, with small particle 40 and larger particle 42. As can be seen, small particle 40 proceeds along a path that is substantially linear to the pressure differential axis path, while the large particle 42 migrates in a non-linear path as it proceeds through the separator assembly. To facilitate a desired particle separation, the orientation of the members in relation to one another can be manipulated to provide a size exclusion separation that can range from >600 μm down to <10 μm as desirable. Referring to FIG. 5, for example, pin-to-pin distance; pin offset; and/or row-to-row distance can be manipulated to achieved a desired particle separation.

Figure 6:
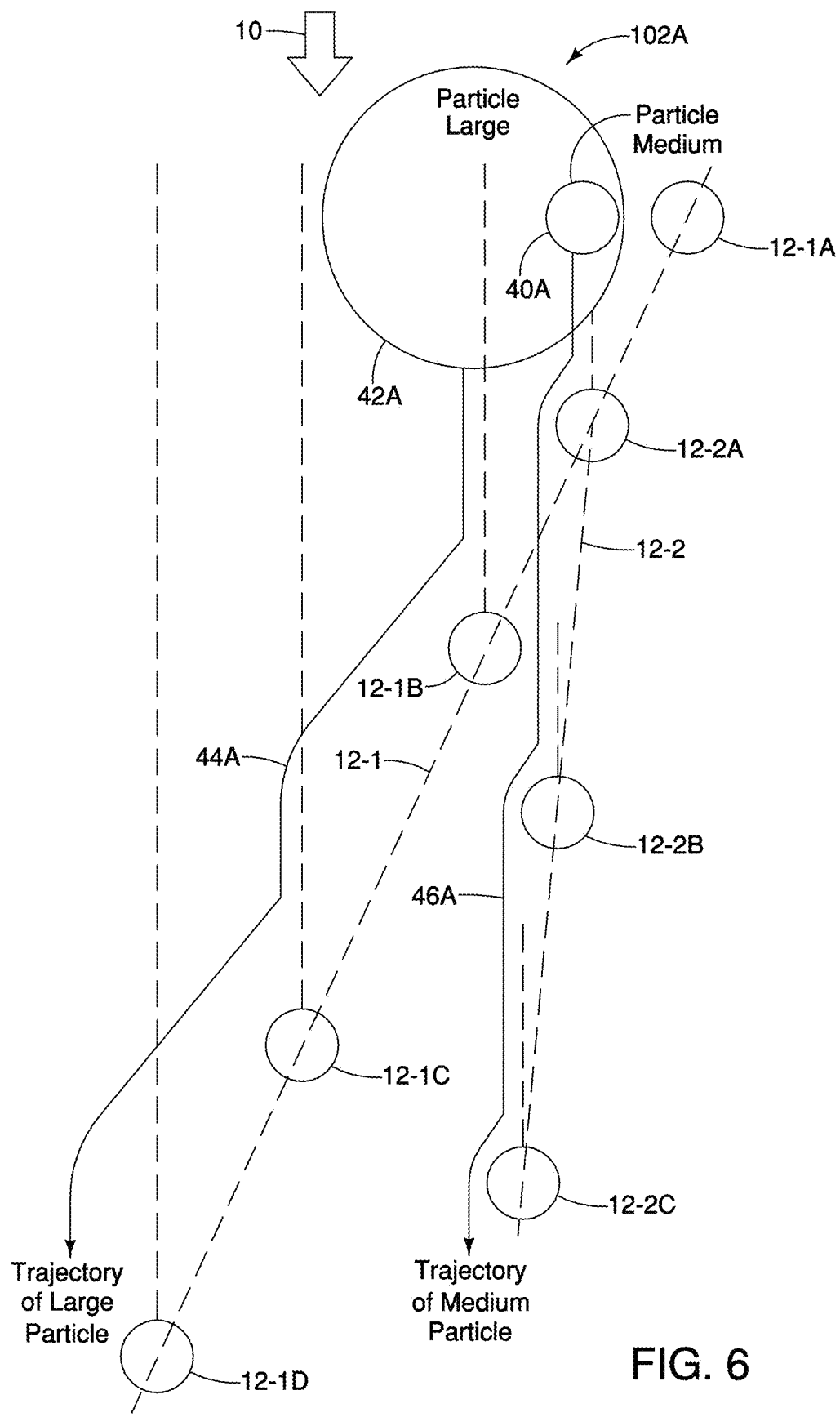
FIG. 6 is another depiction of another relationship of members within a separator assembly according to an embodiment of the disclosure.

Referring to FIG. 6 another depiction of another relationship of members 12-1A to 12-2C within a separator assembly 100A is shown. As can be seen, members 12-1A to 12-1D can be aligned along one axis 12-1 and members 12-2A to 12-2C can be aligned along another axis 12-2. As shown, these axes are not parallel with an angle of departure from pressure differential axis 10 being greater for axis 12-1 than axis 12-2. Accordingly, particle 40A can proceed along members 12-1A and 12-1B but along members 12-2A to 12-2C along path 46A. Particle 42A can proceed along trajectory 44A without proceeding between members 12-1A to 12-1D. Accordingly, the members need not be aligned in levels normal to the axis 10.

Figure 7:
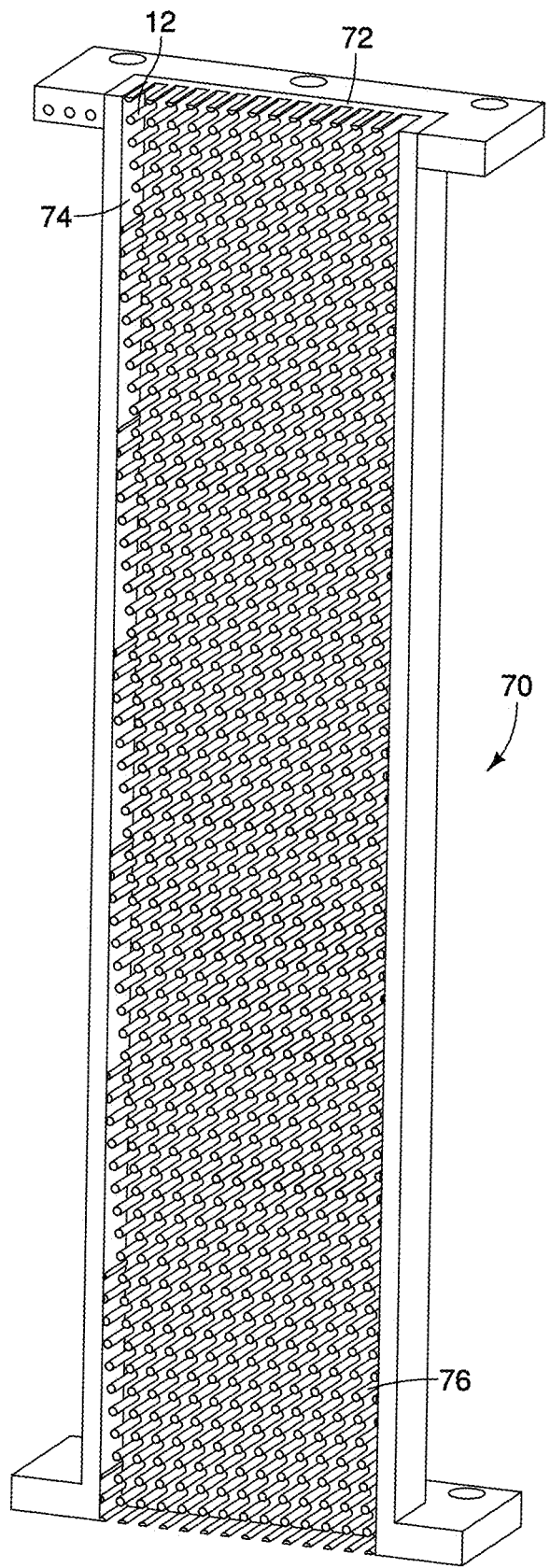
FIG. 7 is a separator assembly according to an embodiment of the disclosure.

Referring to FIG. 7, a separator assembly 70 is shown that includes a plurality of members extending from support member 72 with opposing support member not shown, to demonstrate a cross sectional of separator assembly 70. As can be seen, because of the juxtaposition of the levels and/or the sets of members 12, there are slight openings 74 along one side of assembly 70, while there are no openings along the other side 76 of assembly 70. Accordingly, as fluid with particles migrates through assembly 70, the larger particles will migrate toward the side without openings, while the small particles will not migrate relative to the side with openings.

Figure 8A:
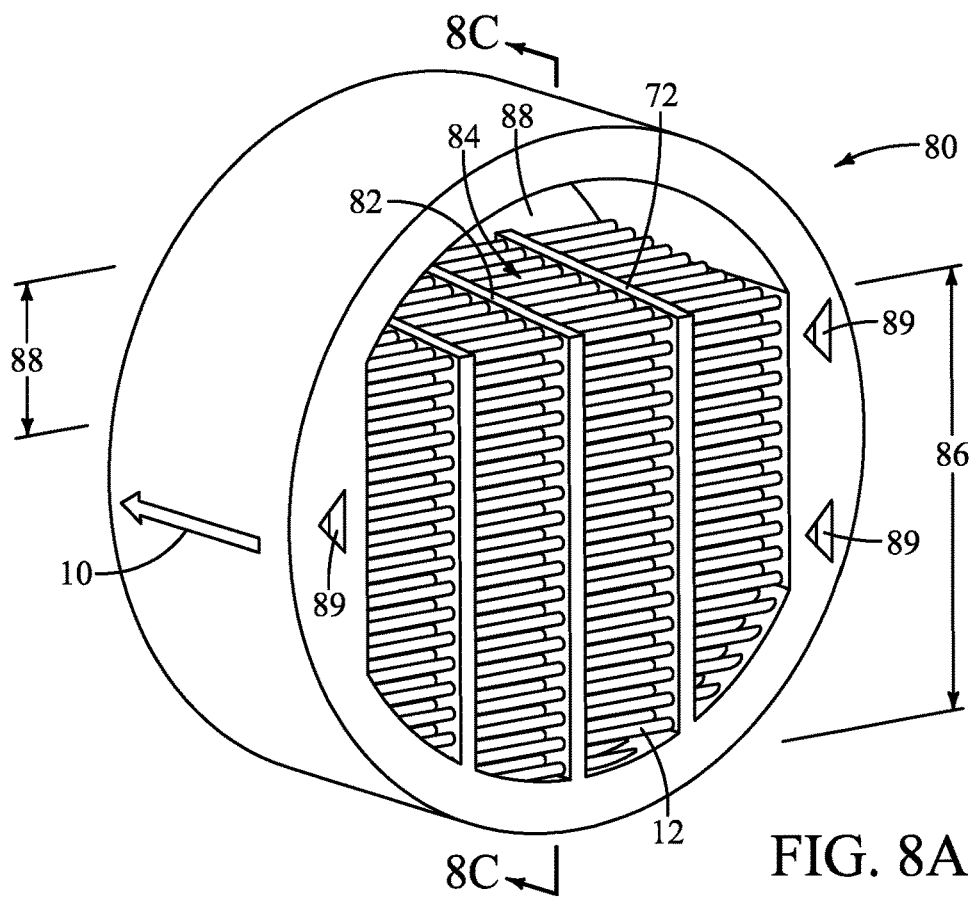
FIGS. 8A-8C are depictions of a separator assembly according to an embodiment of the disclosure and a cross section of same.
Figure 8B:
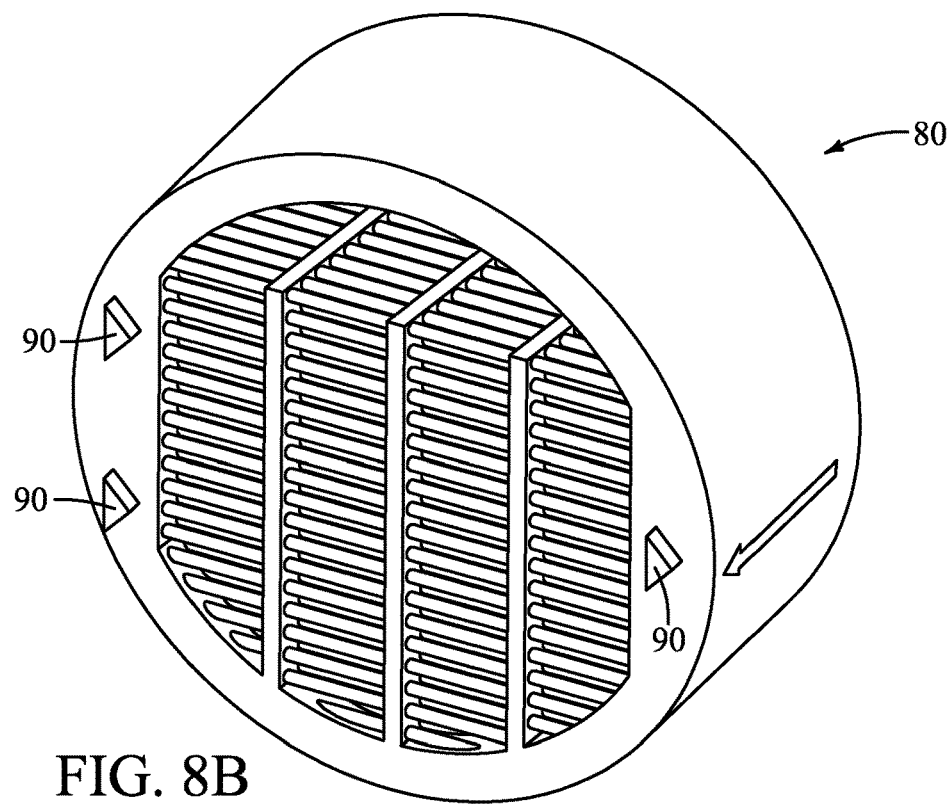
Figure 8C:
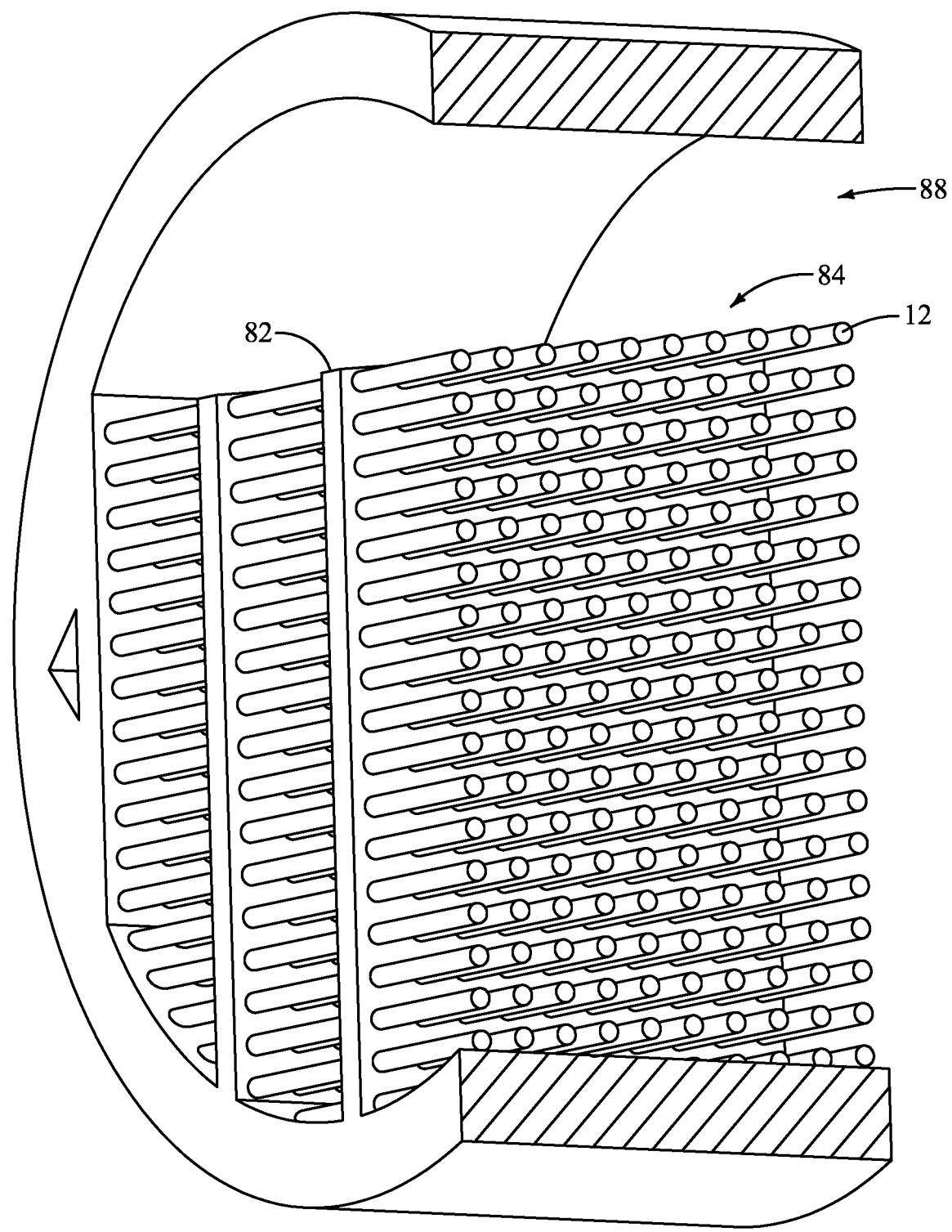

Referring next to FIGS. 8A-8C, an embodiment of a separator assembly is shown in two views and a cross section of same. Referring first to FIG. 8A, separator assembly 80 can include a plurality of members 12 arranged between supports 72 and 82 that represent a channel 84 of separator assembly 80. Accordingly and as shown, separator assembly 80 can include a plurality of channels; as shown in this embodiment, four channels. The cross section of members 12 within these channels can be configured as shown in FIGS. 1A-3C. In accordance with example implementations, separator assembly 80 can be aligned along a pressure differential axis 10, and the separator assembly can occupy a portion 86 of assembly 80 while leaving another portion 88 open for fluid flow. This open portion can be considered an express way or lane and allow for fluid entering the assembly to pass along the pressure differential axis unencumbered. However, the members of the separator assembly, as well as the channels, are in fluid communication with the express way allowing for larger particles to migrate out of the channels and into the express way. In some embodiments a partial physical barrier is contemplated to permit some but not complete fluid communication. While shown and described along one side of the assembly this lane or way can be on multiple sides and/or located through a more center portion of the assembly. Additionally, multiple express ways can be provided.

Referring next to FIG. 8B, assembly 80 can include coupling projections configured to allow for the aligned coupling of the separator to additional separators as a modular separator assembly, and these are shown as projections 90 and complimentary recesses 89. Other types of projections and/or coupling mechanisms and alignment mechanisms are contemplated. The leading edge of set of separators can be angled or smoothed rather than blunt. Accordingly, pressure drop can be minimized.

Figure 9A:
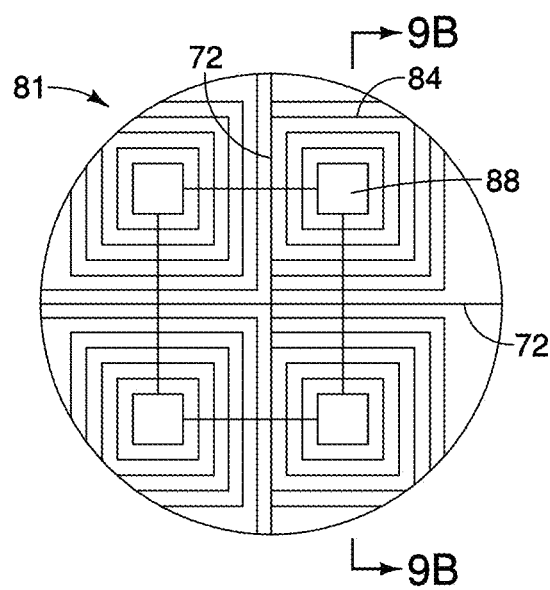
FIGS. 9A-9B are depictions of a separator assembly according to an embodiment of the disclosure and a cross section of same.
Figure 9B:
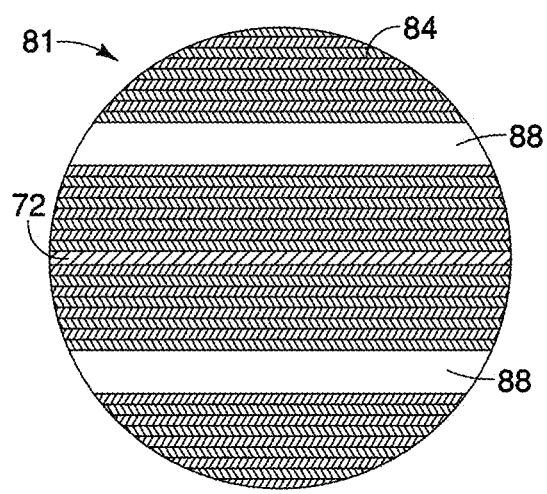

Referring next to FIGS. 9A-9B, another separator assembly or configuration within a conduit is shown as assembly 81. As shown, members 84 are aligned about open portion 88. Accordingly, members 84 can be configured to provide particle size separation with the larger particles proceeding to within portion 88 and smaller particles proceeding along the pressure differential axis. Members 84 can be supported by supports 72 for example. Accordingly, a conduit or assembly may have multiple open portions or expressways. Each of the expressways can be in fluid communication with a conduit separate from another conduit in fluid communication with the pressure differential axis along the members thereby providing for separation of large from small particles within the fluid.

Figure 10:
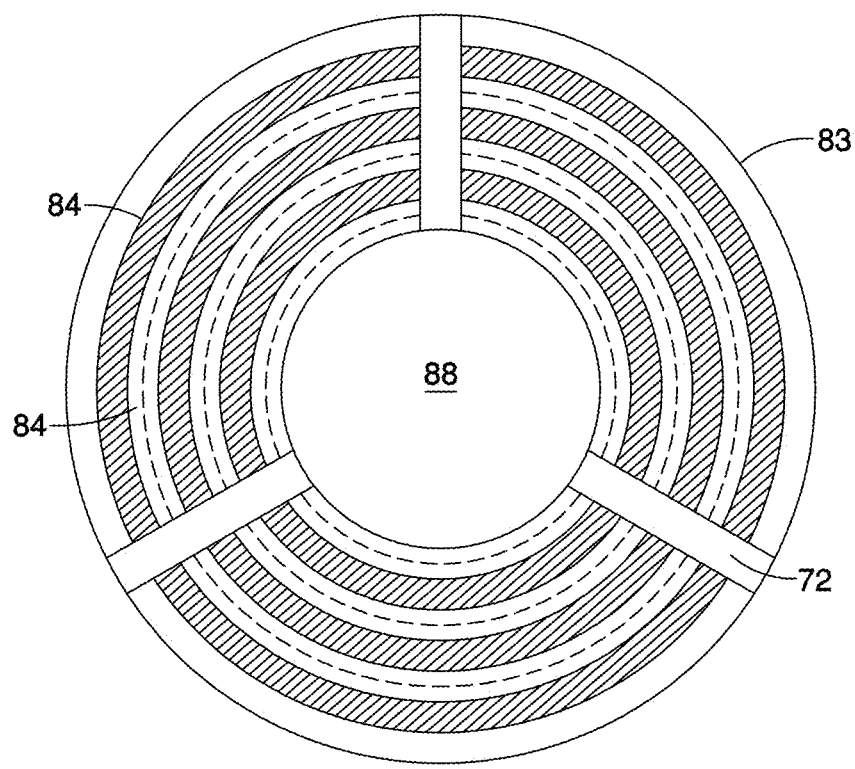
FIG. 10 is a depiction of a separator assembly according to an embodiment of the disclosure.

Referring next to FIG. 10, a depiction of another assembly or configuration 83 is shown that includes members 84 arranged as bent or curved elongated members 84. In accordance with this embodiment, multiple sections can be provided as bracketed by supports 72. The sections may have the same or different size exclusion characteristics. Accordingly, particles of larger size are provided to a central open portion 88 while the sections are in fluid communication with the same or different conduits as desired to accumulate particles of a known size limitation. Supports for this embodiment, for example, can be configured to spiral. Accordingly, supports can spiral along the pressure differential axis from the opening to the exit of the separation assembly.

Figure 11:
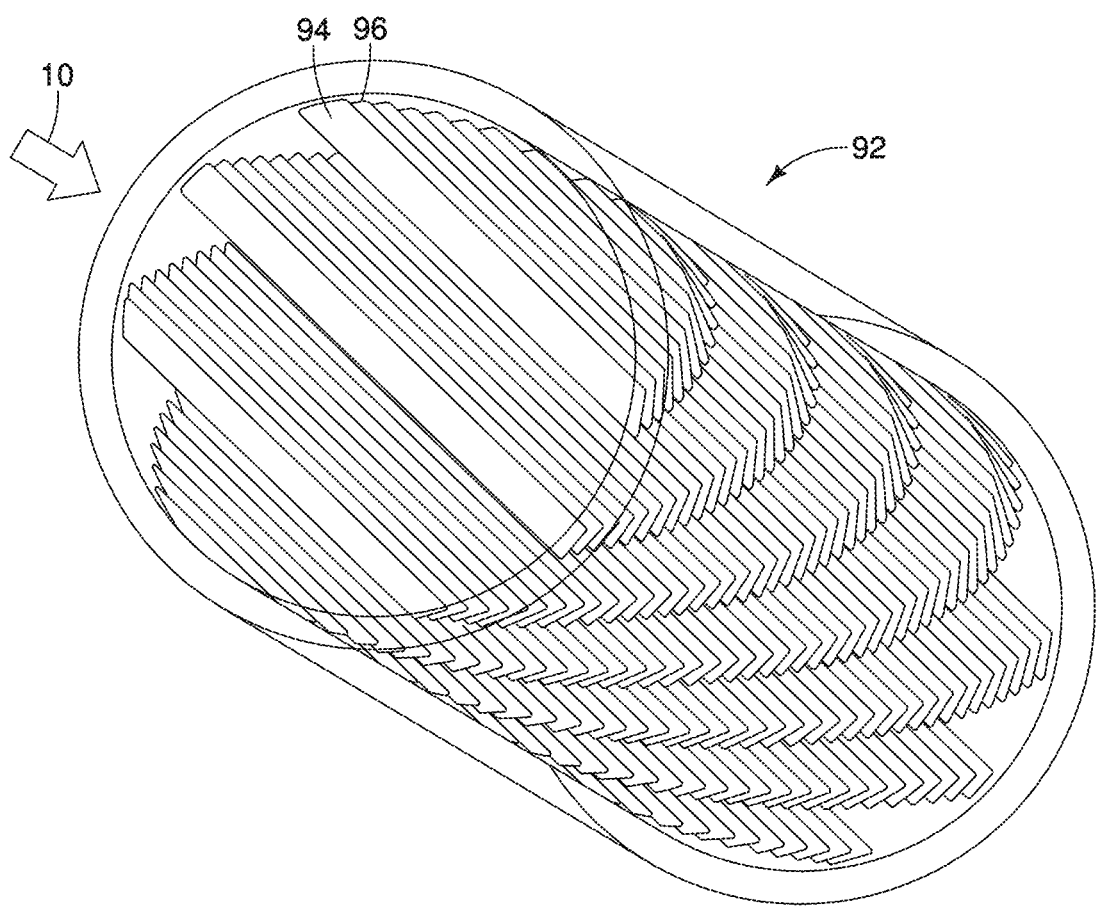
FIG. 11 is a depiction of a separator assembly according to an embodiment of the disclosure.

Referring next to FIG. 11, in accordance with another embodiment of the disclosure, separator assembly 92 is shown with supporting members 94 and 96 oriented in an anti-normal orientation to pressure differential axis 10. In this configuration supporting members 94 and 96 are arranged neither parallel nor normal to pressure differential axis 10.

Figure 12:
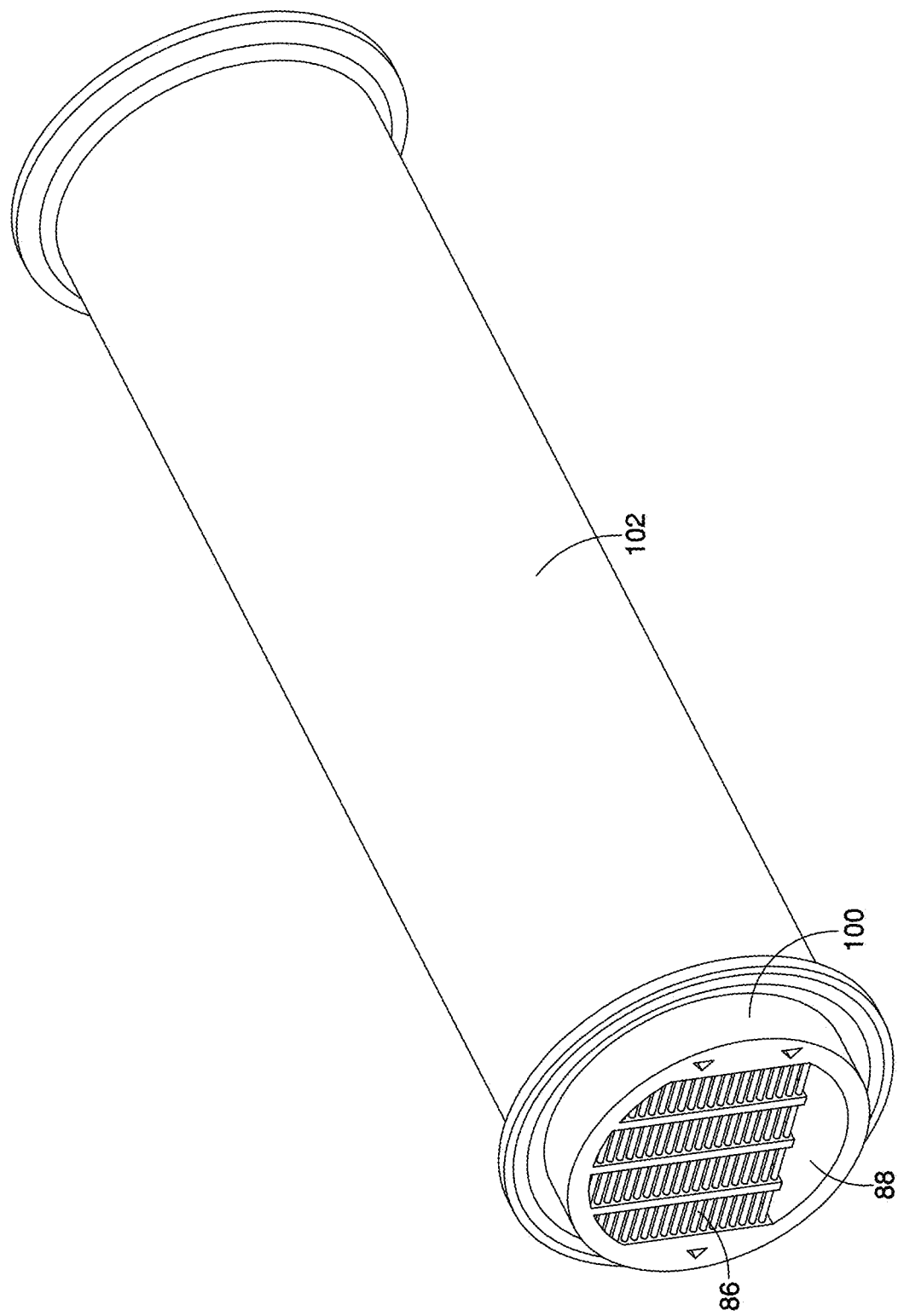
FIG. 12 is a depiction of a separator assembly according to an embodiment of the disclosure.

Referring next to FIG. 12, separator assembly 100 can be oriented within conduit 102. As shown in this configuration, the open cross sectional portion 88 of assembly 100 is arranged operationally in relation to members and channels of separator assembly portion 86. Open portion 88 of separator assembly 100 can be oriented in a gravitationally lower position in relation to separator assembly portion 86, for example, however, this orientation of the open portion in relation to the members can be lateral, above, and/or central. According to example implementations, assembly 100 can be referred to as a module. This module may be inserted either alone or in combination with other modules within a conduit such as a pipe within a processing facility. In accordance with example implementations, the alignment of the modules can proceed about a bend or curve. Accordingly, a multiple channel bend is contemplated so that partially separated particles may migrate from one module to the next without losing its alignment.

Figure 13:
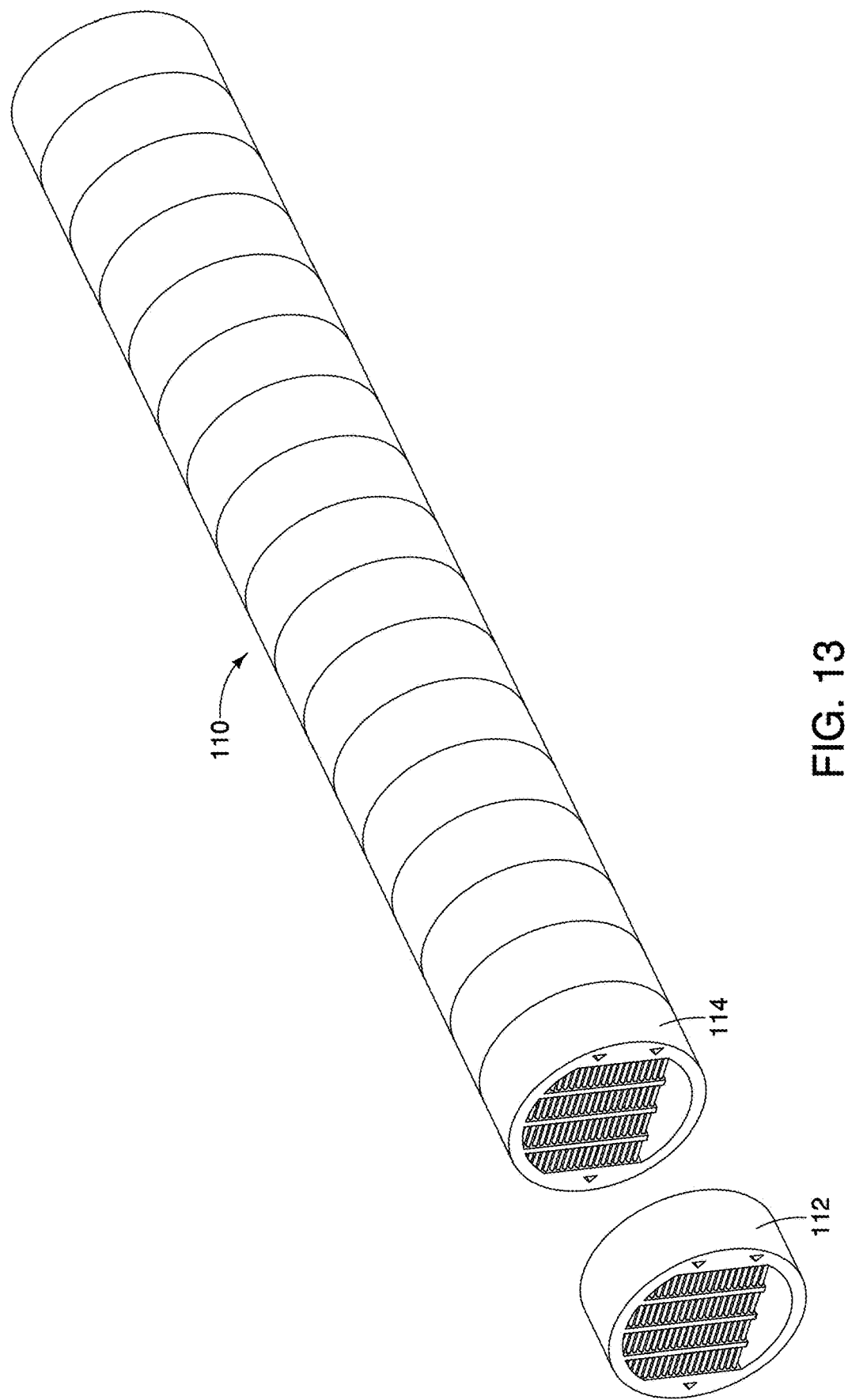
FIG. 13 is a separator assembly according to an embodiment of the disclosure.

Referring next to FIG. 13, separator assembly 110 is shown in a modular configuration that includes at least a plurality of modules 112 and 114. These modules may be configured to separate sizes along the same size separation configuration, or they may be configured to separate particles according to different size exclusion parameters. For example, as the modules are distal from one another along the pressure differential axis, the distal module may have a size exclusion for particle size that is smaller than the size exclusion based on particle size of the previous module in assembly 110. In accordance with additional embodiments, the separation array of modules may be combined with entrance and exit manifolds so that multiple separations take place in one larger cross section. In other embodiments, individual modules within an array may be operatively aligned with outlets intermediate to the final outlets, thereby allowing for the separation along multiple size parameters. This embodiment, can provide for the selection of particles of an intermediate size. For example, one size is separated out with the first module or array. A second module or array separates particles of a second size thereby providing for the separation of multiple sizes.

Figure 14:
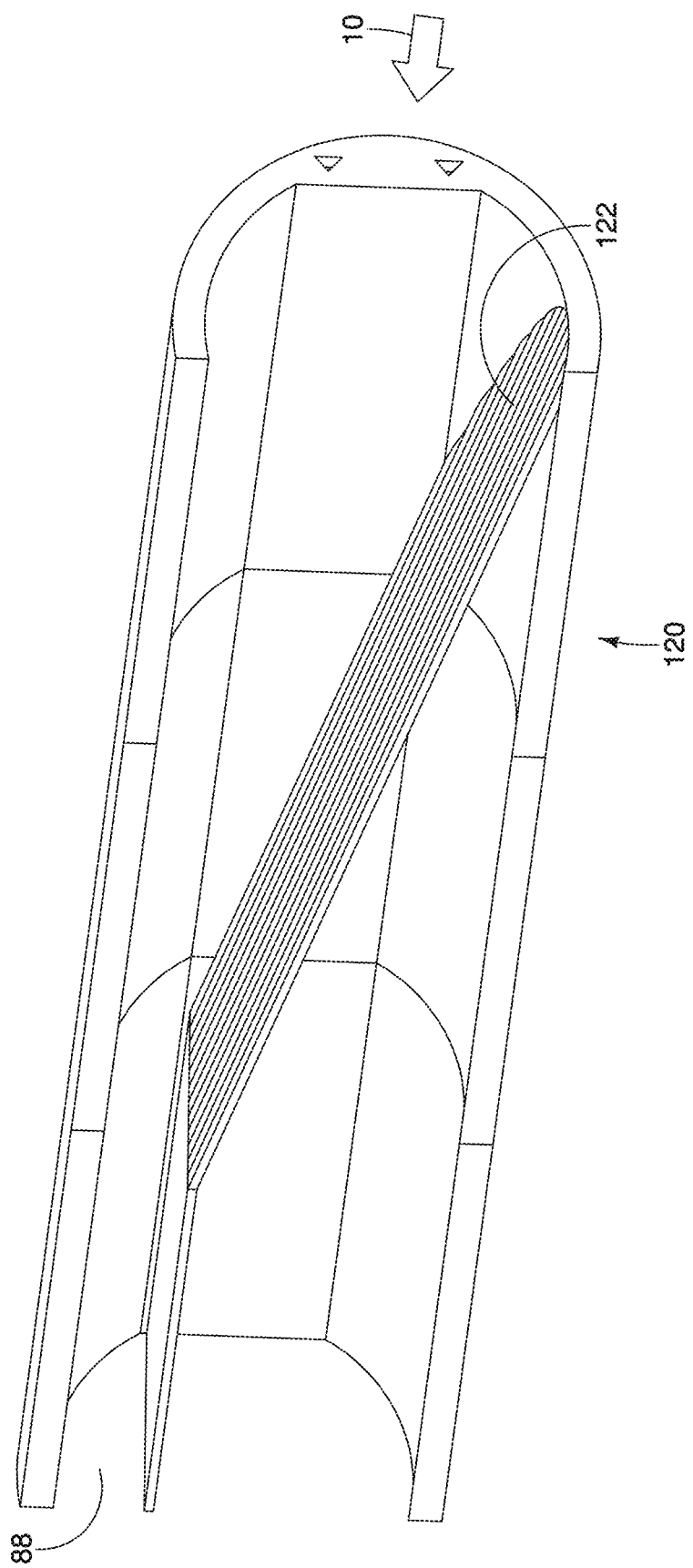
FIG. 14 is a portion of a separator assembly according to an embodiment of the disclosure.

Referring next to FIG. 14, a portion of a separator assembly 120 is shown that includes an opening 88 having a cross sectional area. In this configuration, a separation screen 122 can be utilized to facilitate the flow of larger particles into opening 88 while allowing smaller particles to proceed towards subsequent or distal separator assemblies. As shown here, the screen is arranged as a series of slats; however, other arrangements are contemplated, for example, a mesh. Further, screen 122 is arranged at an angle rather than normal to axis 10. This can facilitate flow by reducing the number of the largest particles (those particles with a diameter larger than the spacing between the first row of members) that are presented to the first row of members.

Figure 15A:
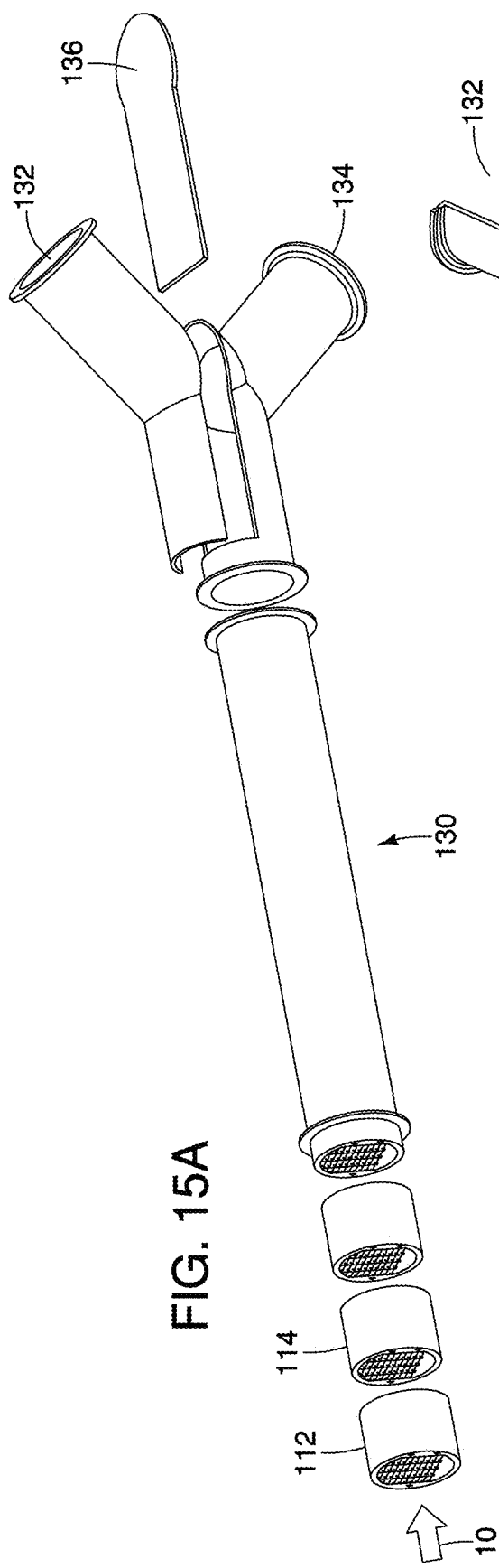
FIGS. 15A and 15B are separator assemblies according to an embodiment of the disclosure and a cross sectional view of same.
Figure 15B:
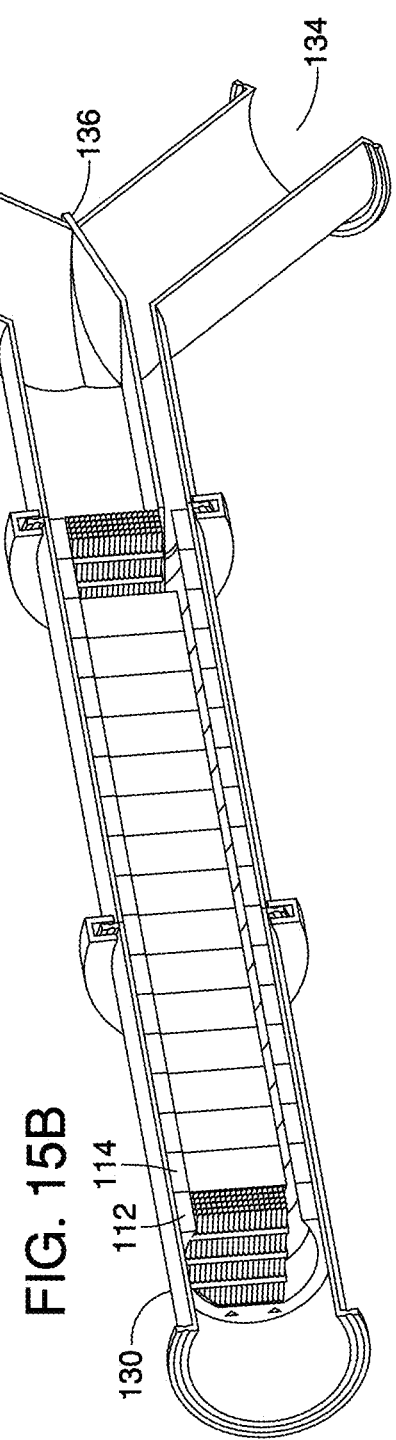

Referring next to FIGS. 15A and 15B, an additional separator assembly 130 according to an embodiment of the disclosure is provided that includes multiple modules 112 and 114, for example, operatively configured in relation to pressure differential axis 10. Assembly 130 can include two outlets, 132 and 134. Outlet 132 can be configured to receive fluid that includes mostly small particles, and outlet 134 can be configured to receive fluid that includes mostly large particles. In between these two outlets can be a divider 136 that prevents the backflow of large particles into the separator assemblies or through outlet 132.

Figure 16A:
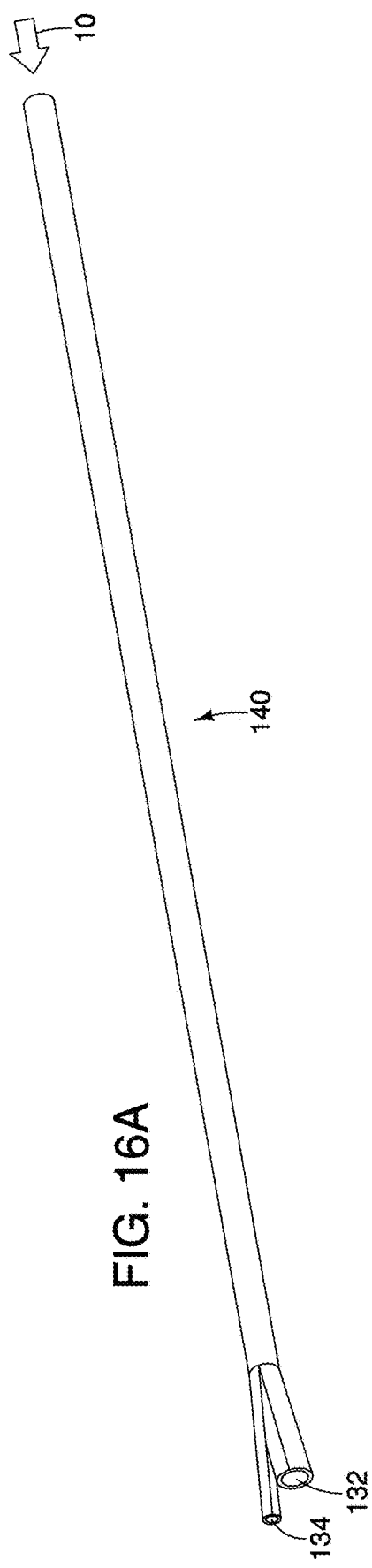
FIGS. 16A and 16B are a depiction of a separator assembly according to an embodiment of the disclosure and a cross sectional view of same.

Referring next to FIG. 16A, in accordance with another example implementation, assembly 140 can be configured to receive fluid including particles of different sizes, and provide that fluid to outlets 132 and 134 that are configured as previously described with reference to FIGS. 15A and 15B.

Figure 16B:
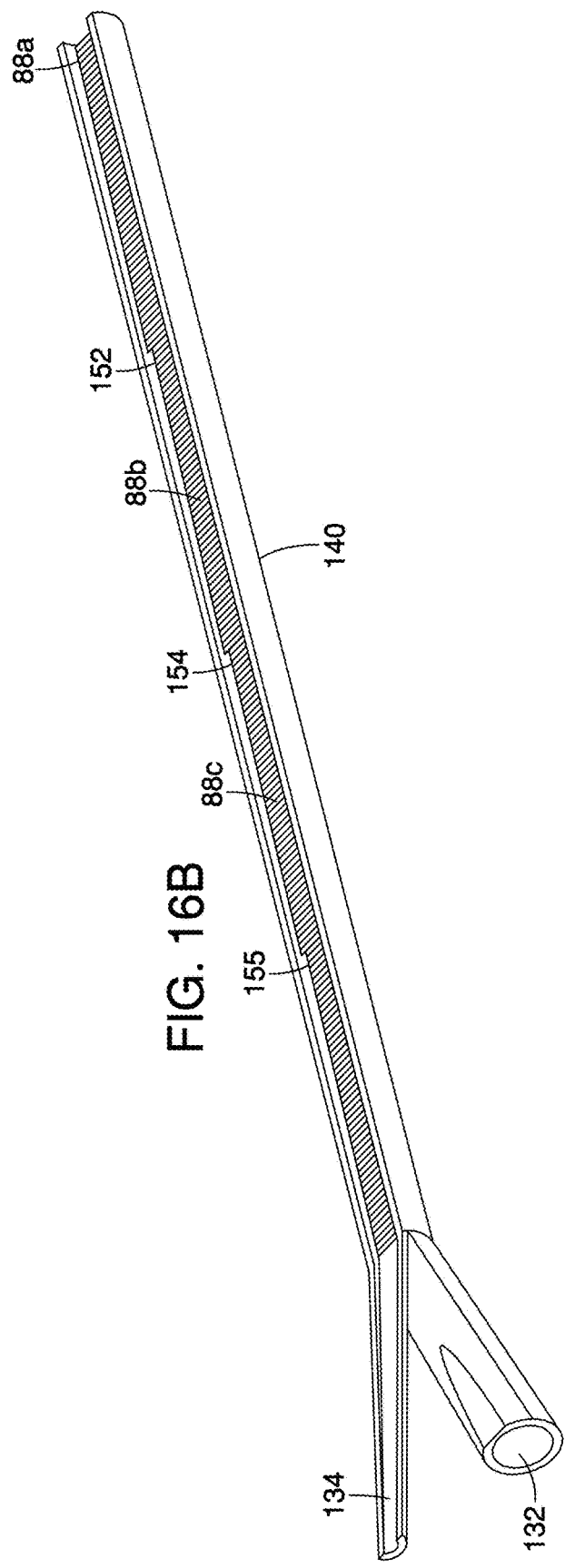
Figure 17:
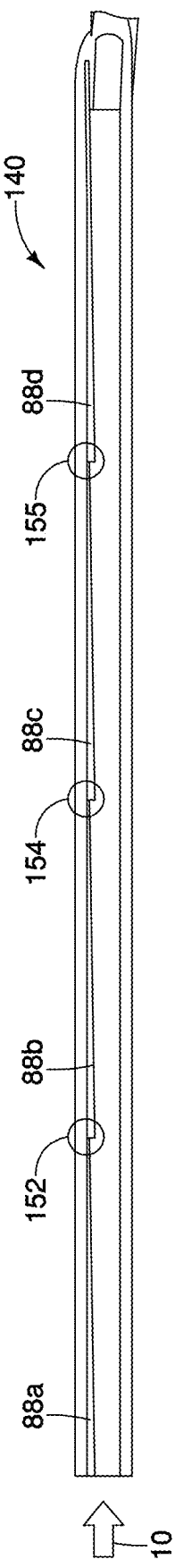
FIG. 17 is a cross section of a separator assembly according to an embodiment of the disclosure.

Referring next to FIGS. 16B and 17, another depiction of the assembly 140 of FIG. 16A is shown. Separator assembly 140 is provided that is configured to receive fluid containing at least two different size particles along a pressure differential axis 10. As the cross section of FIGS. 16B and 17 depicts, separator assemblies can be arranged in series with each separator assembly providing for the separation of different sized particles. Accordingly, the interface 152, 154, and 155 of these different modules can provide for larger cross sectional areas 88a, 88b, 88c, and 88d. For example, each of these successive areas can be larger than the preceding areas.

Figure 18:
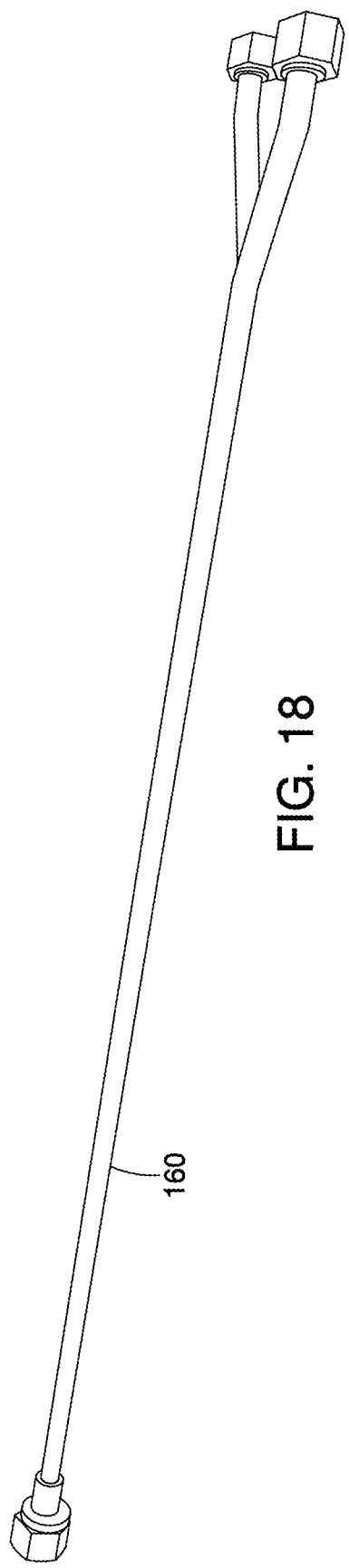
FIG. 18 is a separator assembly according to an embodiment of the disclosure.
Figure 19B:
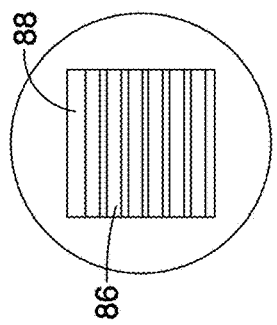
FIGS. 19A-19B are views of the separator assembly of FIG. 15 according to embodiments of the disclosure.
Figure 19A:
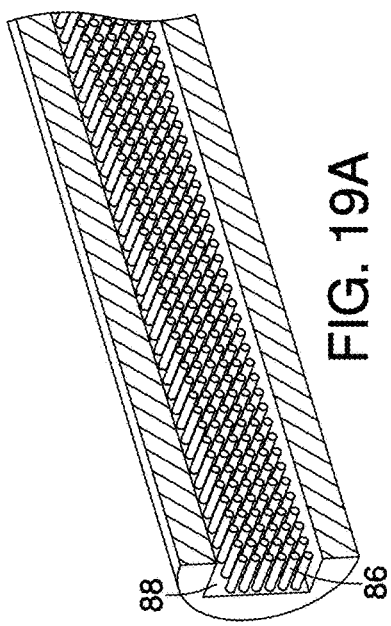

Referring next to FIG. 18, an assembly 160 is shown, with end view of assembly 160 shown as FIG. 19B and cross sectional view of 160 shown as FIG. 19A. Accordingly, there can be an open cross sectional area 88 and a separator assembly 86 as shown in FIGS. 19B and 19A. Separator assembly 86 is shown in relation to open cross sectional area 88.

Figure 20:
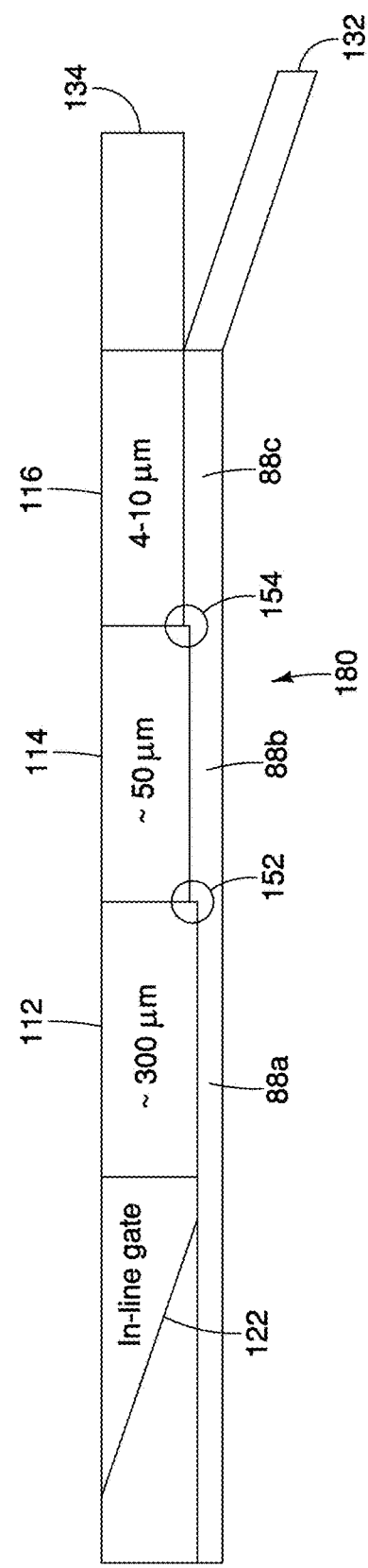
FIG. 20 is a depiction of a separator assembly according to an embodiment of the disclosure.

Referring next to FIG. 20, assembly 180 is provided with modules 112, 114 and 116 arranged along the pressure differential axis 10. Accordingly, assembly 180 can include a pre-separator 122 as well as interfaces 152 and 154 defining stepped configurations which can provide for larger cross sectional area openings 88A, 88B, and 88C. Separator assembly 180 can include an outlet 134 configured to convey particles of the smaller size exiting the assembly, while another outlet 132 is provided to convey particles of a larger size than those exiting at outlet 134.

Figure 21:
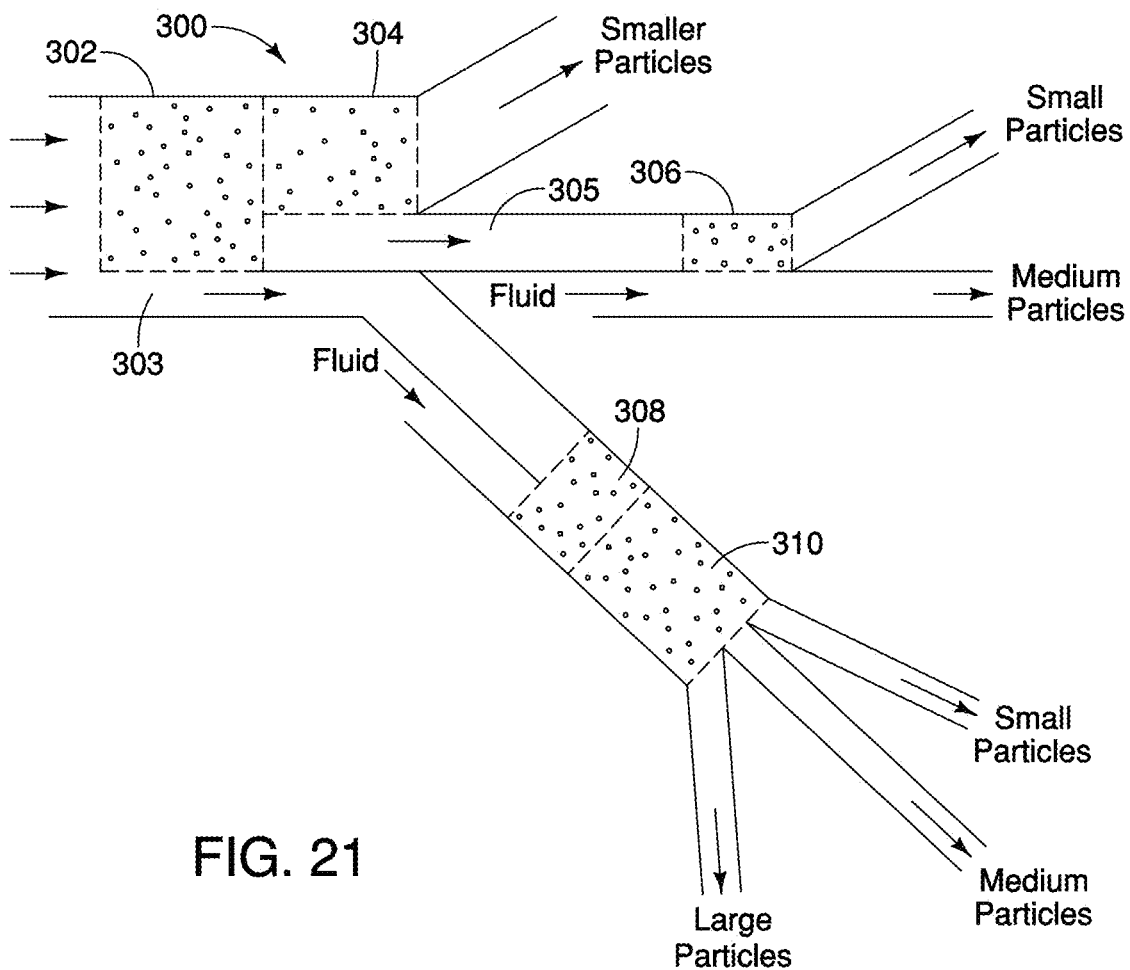
FIG. 21 is a depiction of another separator assembly according to an embodiment of the disclosure.

Referring next to FIG. 21, a system 300 is depicted that can include multiple modules arranged in relation to multiple fluid intakes as well as multiple open portions or express ways. For example, module 302 can include members operatively arranged in relation to an open portion 303. Accordingly, particles of a larger size are transferred to and along portion 303 while smaller particles flow to module 304 which includes members arranged operatively in relation to open portion 305. In some embodiments, particles of a smaller size than the larger particles transferred along portion 303 are separated even further into small and medium sizes with the medium and small particles migrating along open portion 305 and the small particles conveyed to a conduit. Further separation of small and medium particles can be accomplished in module 306. Additionally, the large, medium, and small particles can be conveyed from portion 303 to additional modules 308 and 310 operatively configured and/or arranged in fluid communication with conduits of separated small, medium, and large particles. Recycle of streams may be contemplated. For example, 305 may be configured to recycle to the entrance instead of or in complement to downstream separation.

Figure 22:
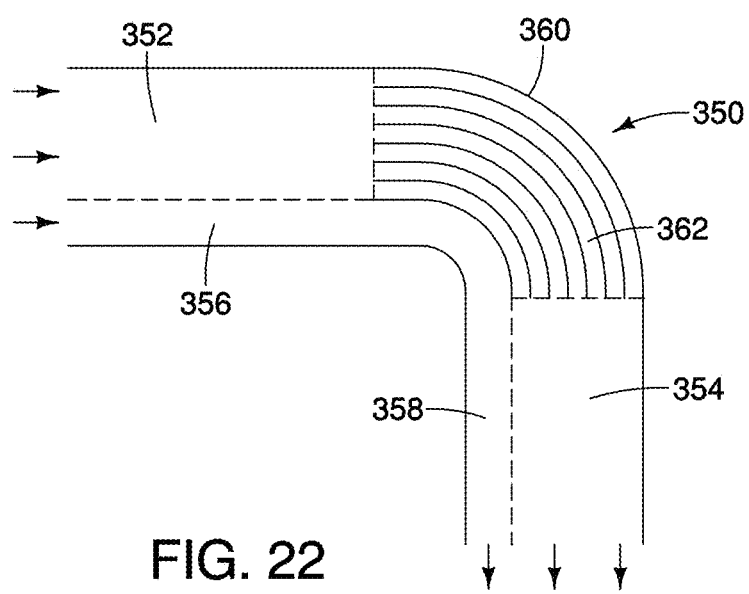
FIG. 22 is a depiction of a separator assembly according to an embodiment of the disclosure.
Figure 23:
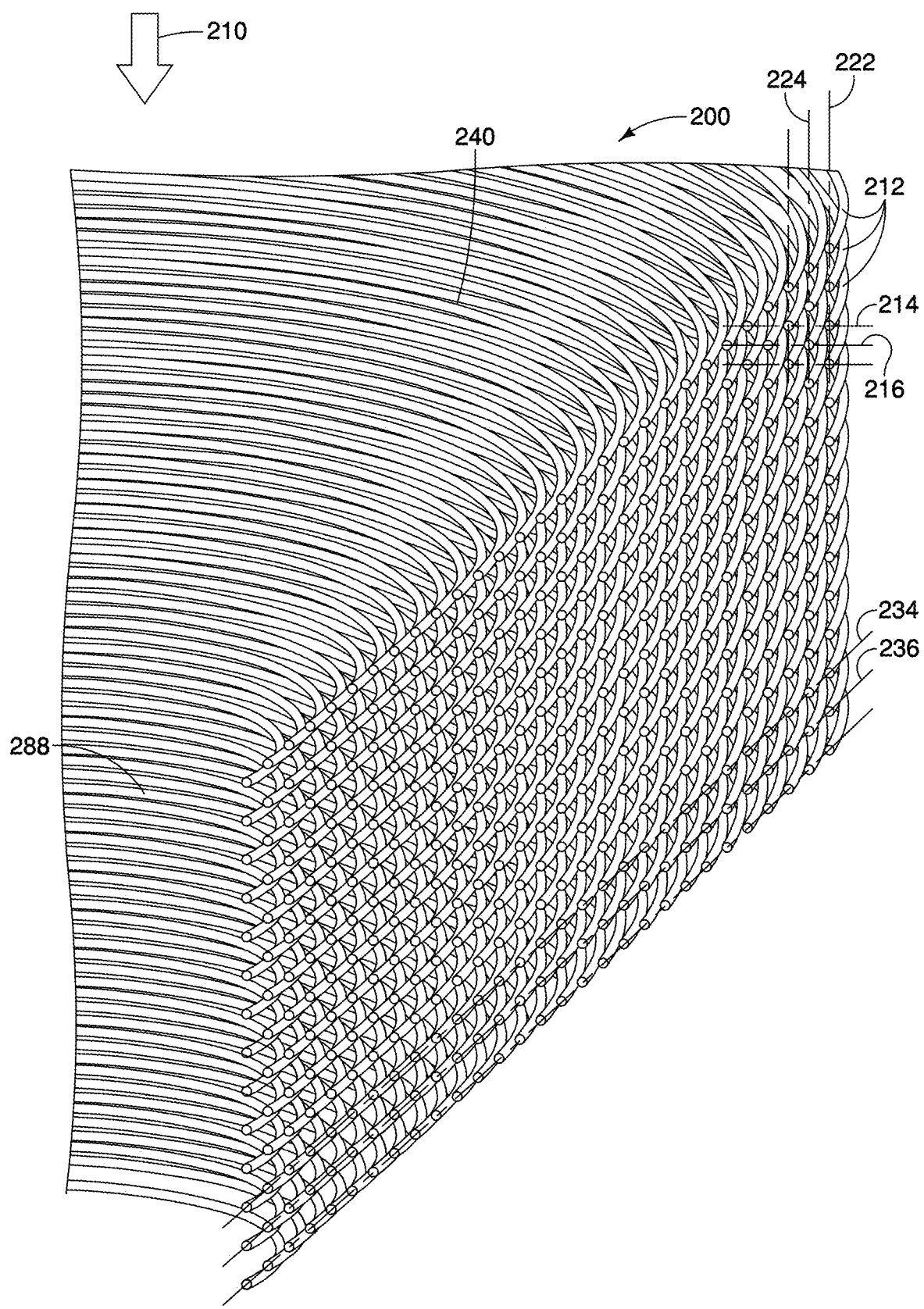
FIG. 23 is a perspective view of a portion of a separator assembly according to an embodiment of the disclosure.
Figure 24:
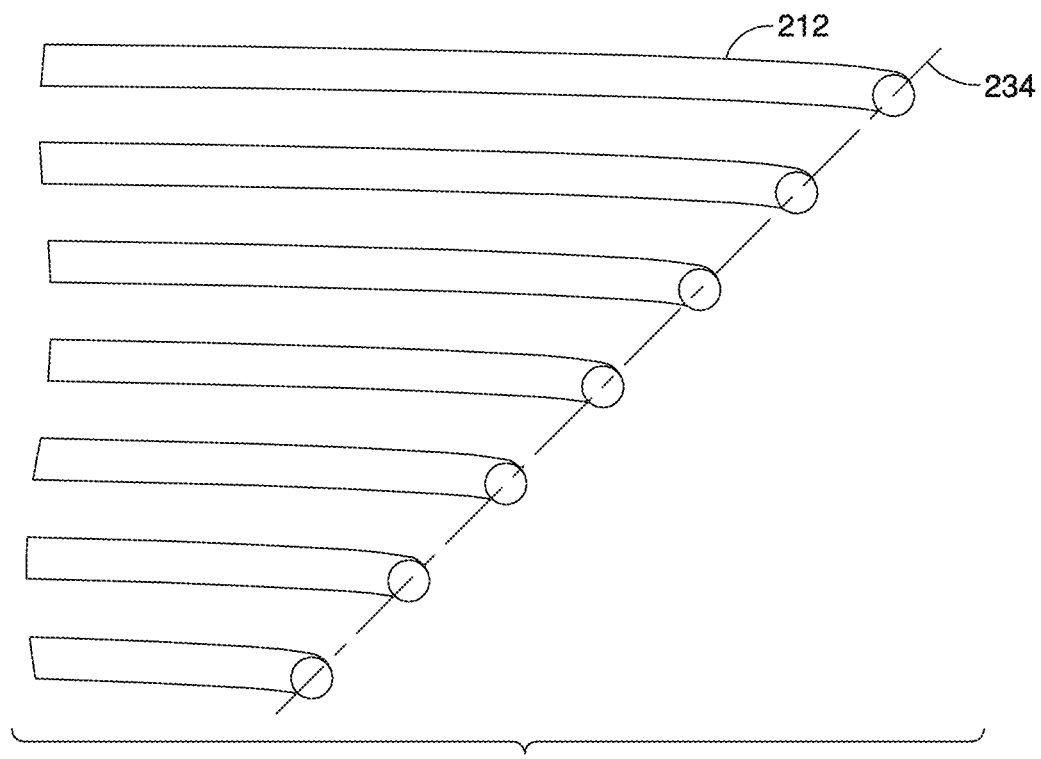
FIG. 24 is a portion of a cross sectional view of the separator assembly of FIG. 23.
Figure 25:
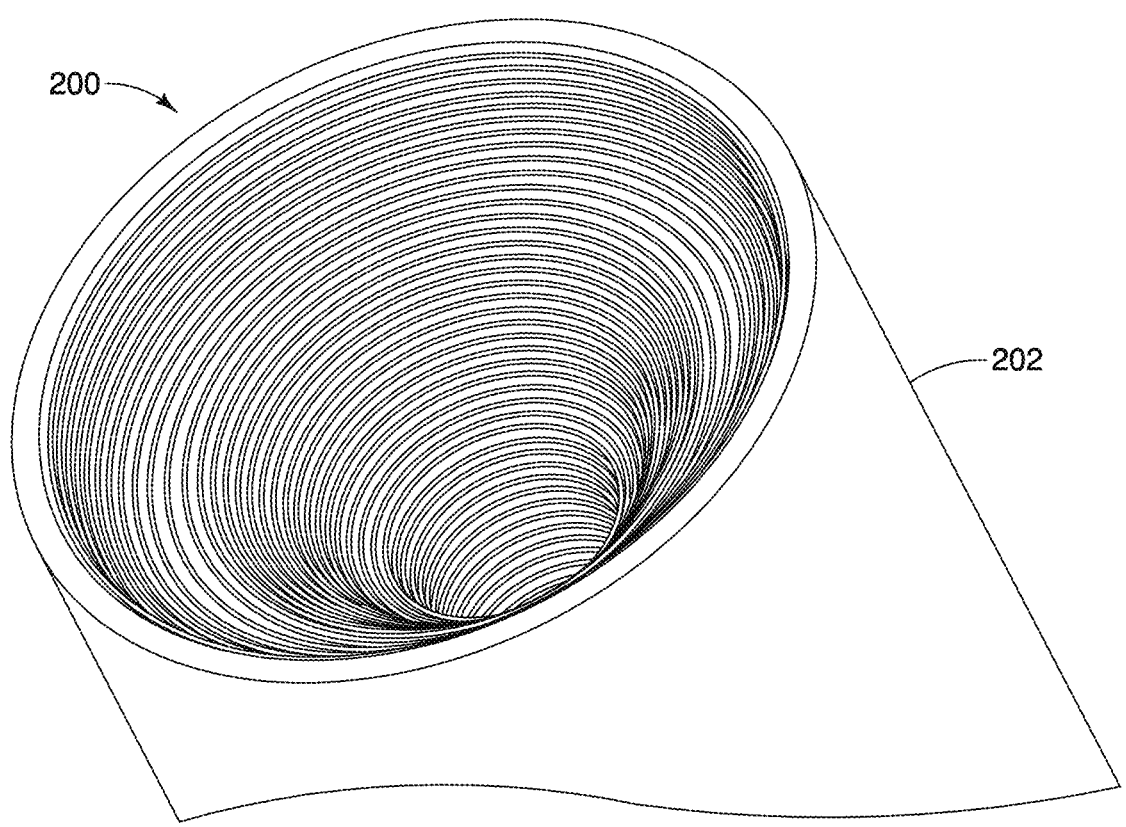
FIG. 25 is a portion of the separator assembly of FIG. 23 according to an embodiment of the disclosure.
Figure 26:
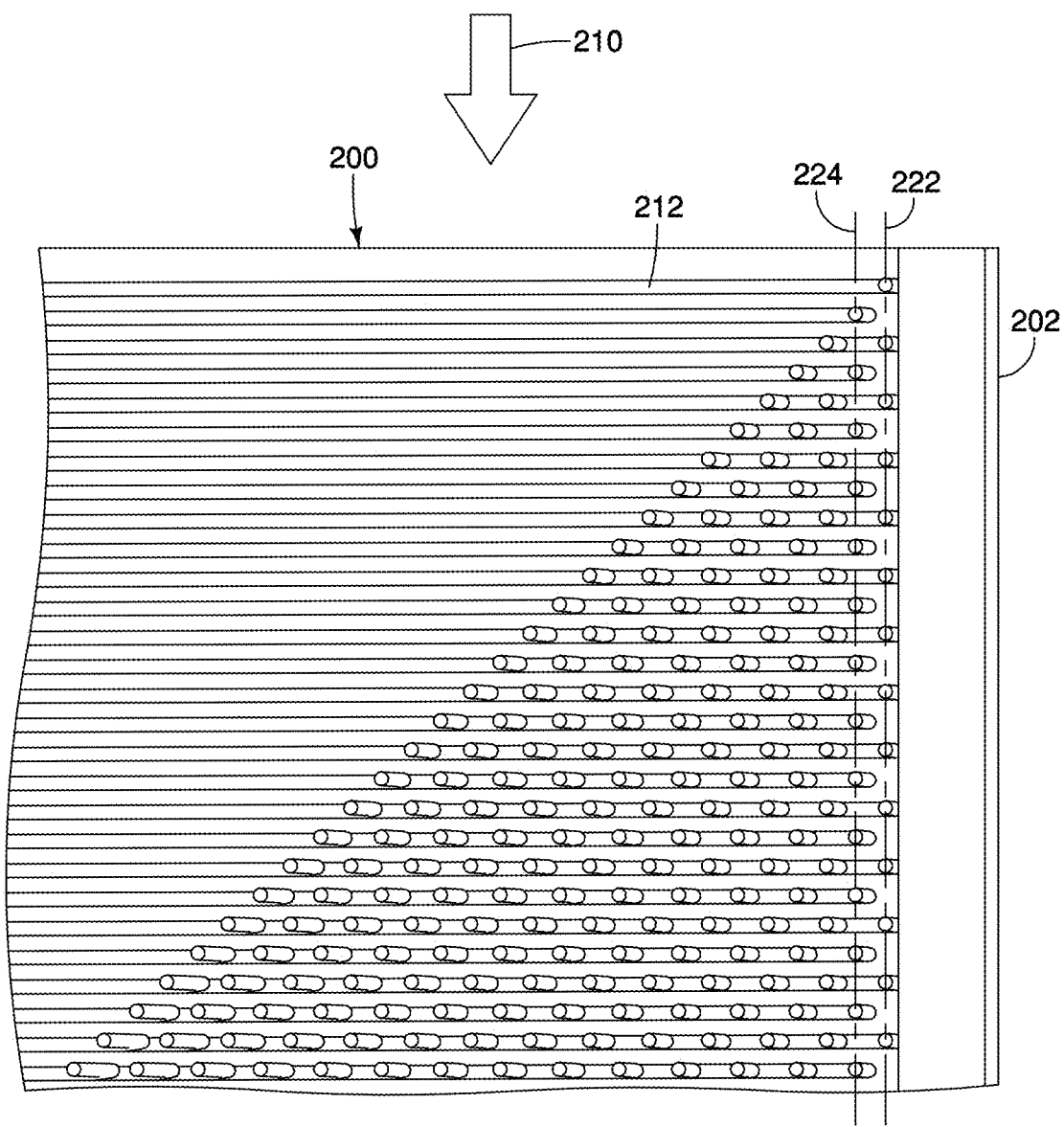
FIG. 26 is a portion of a cross sectional portion of the separator assembly of FIG. 23 according to an embodiment of the disclosure.
Figure 27:
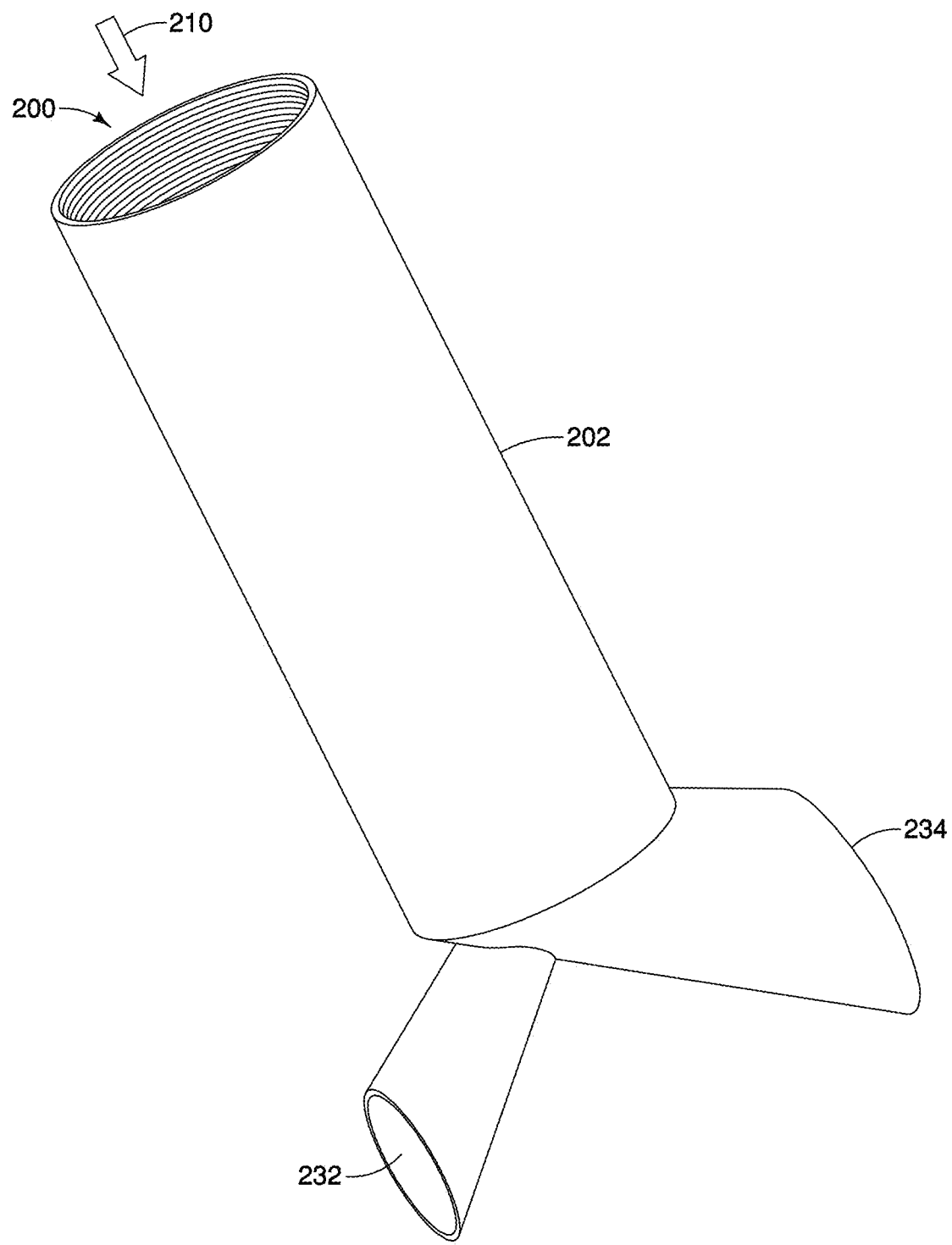
FIG. 27 is the separator assembly of FIG. 23 according to an embodiment of the disclosure.

Referring next to FIG. 22, modules 352 and 354 are shown on both sides of a curved conduit 350. As can be seen, multiple channels 362 exist around a curved portion 360 of the conduit. These channels are aligned with membered portions of the modules while the open portions 356 and 358 remain in fluid communication. While multiple channels are shown, additional embodiments can include a pair of channels, with one channel maintaining fluid communication between the open portions and the other channel maintaining fluid communication between the membered portions.

Referring next to FIGS. 23-27 separator assembly 200 is shown. Assembly 200 can include a plurality of members 212 within a conduit 202. As shown these members are not linear but are arranged to be normal in relation to the pressure differential axis 210. Accordingly, members 212 can be arranged in levels 214 and 216, for example, with each level increasing in the number of sets of members 222 and 224 extending substantially parallel with axis 210 and other sets 234 and 236 extending neither parallel nor normal to axis 210. These members can be arranged to form an inlet cone 240 which as shown here constricts as it progresses along axis 210. Additionally, assembly 200 can include opening 288 which provides unimpeded passage of fluid. As shown, outlet 232 can be operatively aligned with opening 288 and outlet 234 can be operatively aligned with the sets of members 212. A divider is not shown, but may be included.

Figure 28:
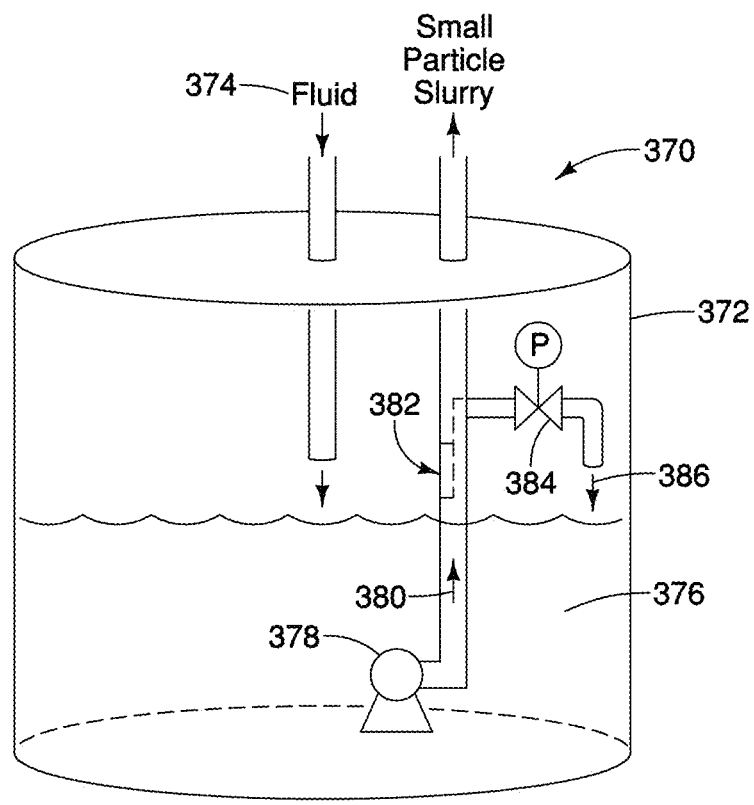
FIG. 28 is a separator assembly within a separation system according to an embodiment of the disclosure.
Figure 29:
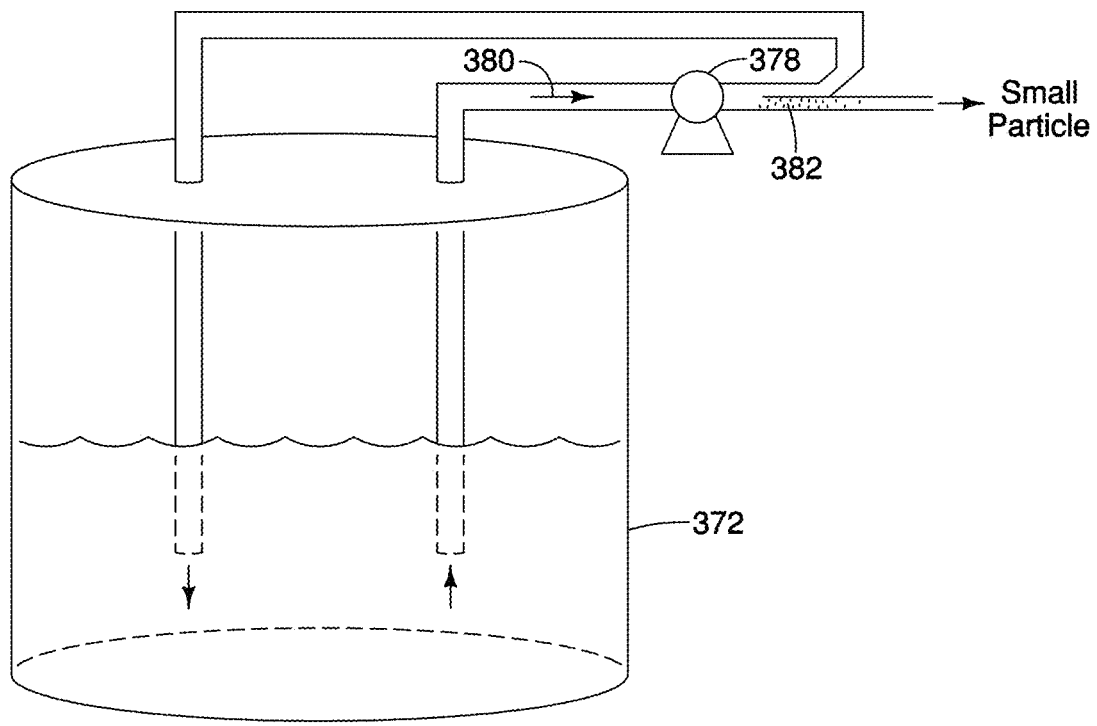
FIG. 29 is another separator assembly within another separation system according to an embodiment of the disclosure.

Referring next to FIGS. 28 and 29, example depictions of a separator/concentrator system 370 is shown that includes a vessel 372 configured to receive a fluid 374 that can include particles of differing sizes. The fluid can be amassed 376 and/or displaced using a pump 378 for example, to provide a pressure differential axis 380. The fluid can be provided through a separator assembly 382 where a membered portion is in fluid communication with a conduit exiting the system and the open portion is in fluid communication with a conduit returning fluid to vessel 372. A valve 384 can regulate the return of large particled fluid 386 to the vessel. Accordingly, system 370 is configured to separate small particles from fluid 374 while concentrating large particles in vessel 372.

Figure 30:
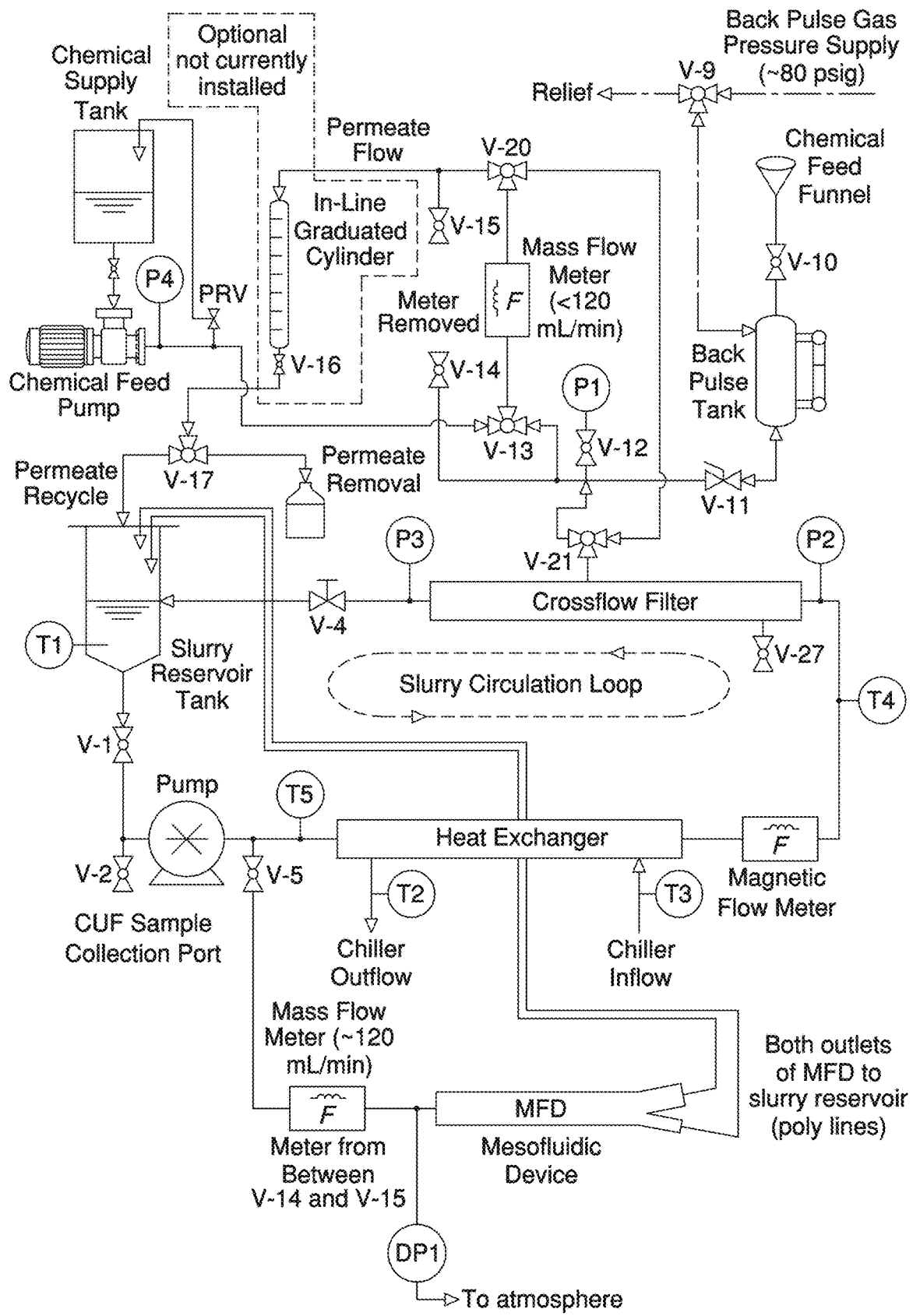
FIG. 30 is a process flow utilizing a separator assembly according to an embodiment of the disclosure.
Figure 31:
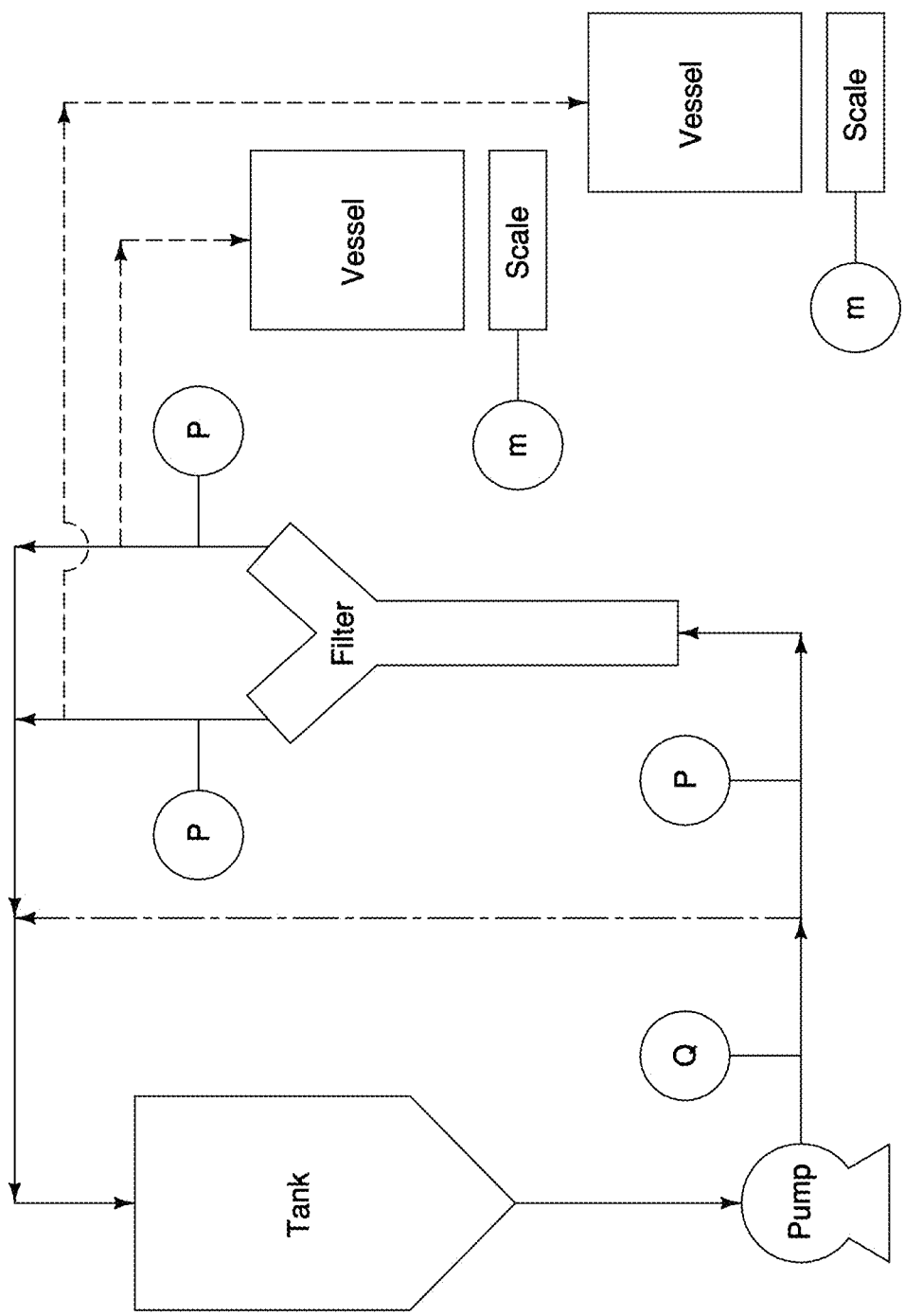
FIG. 31 is a process flow utilizing a separator assembly according to an embodiment of the disclosure.
Figure 32A:
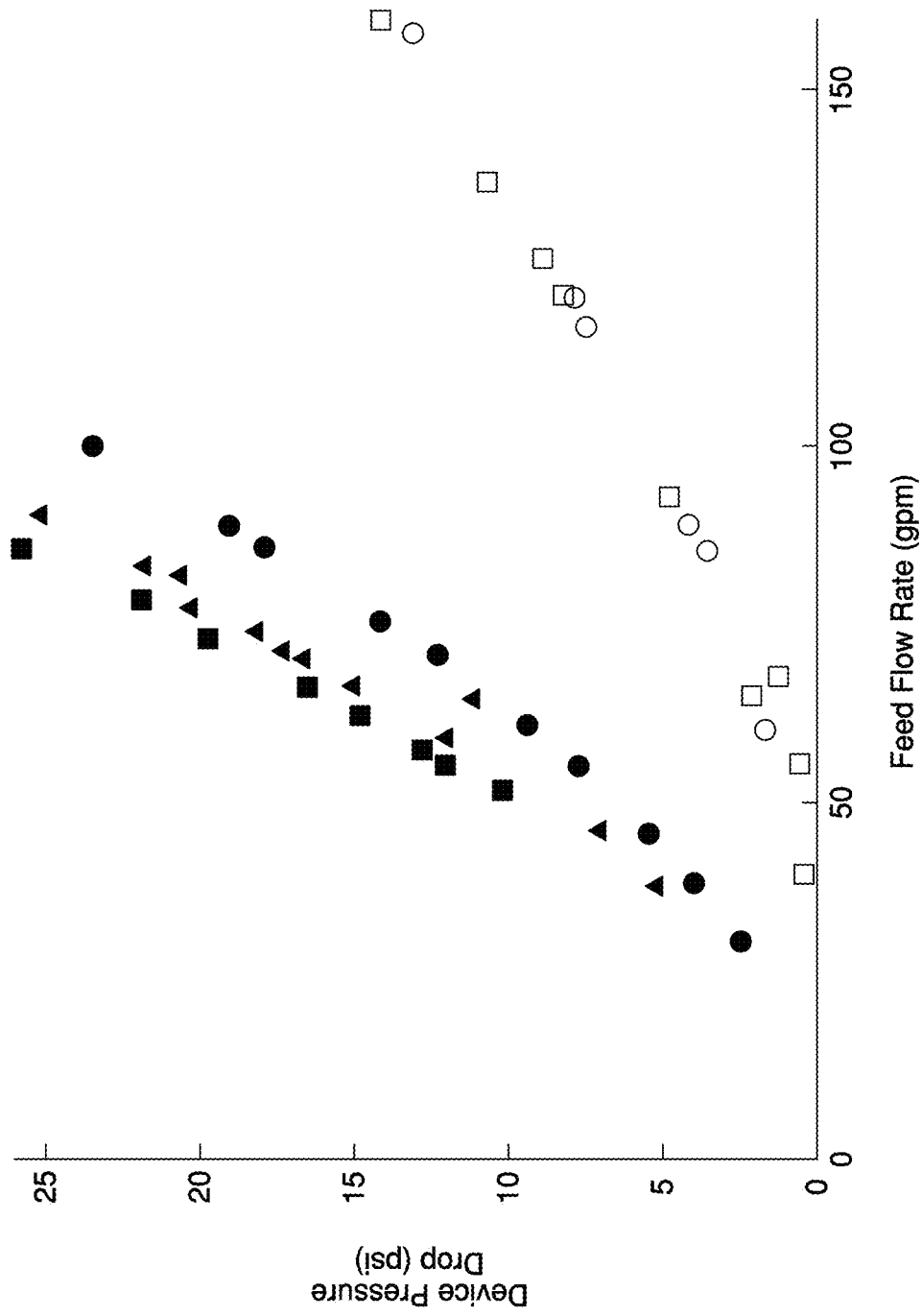
FIGS. 32A-32D are representations of data acquired utilizing separator assemblies according to embodiments of the disclosure.
Figure 32B:
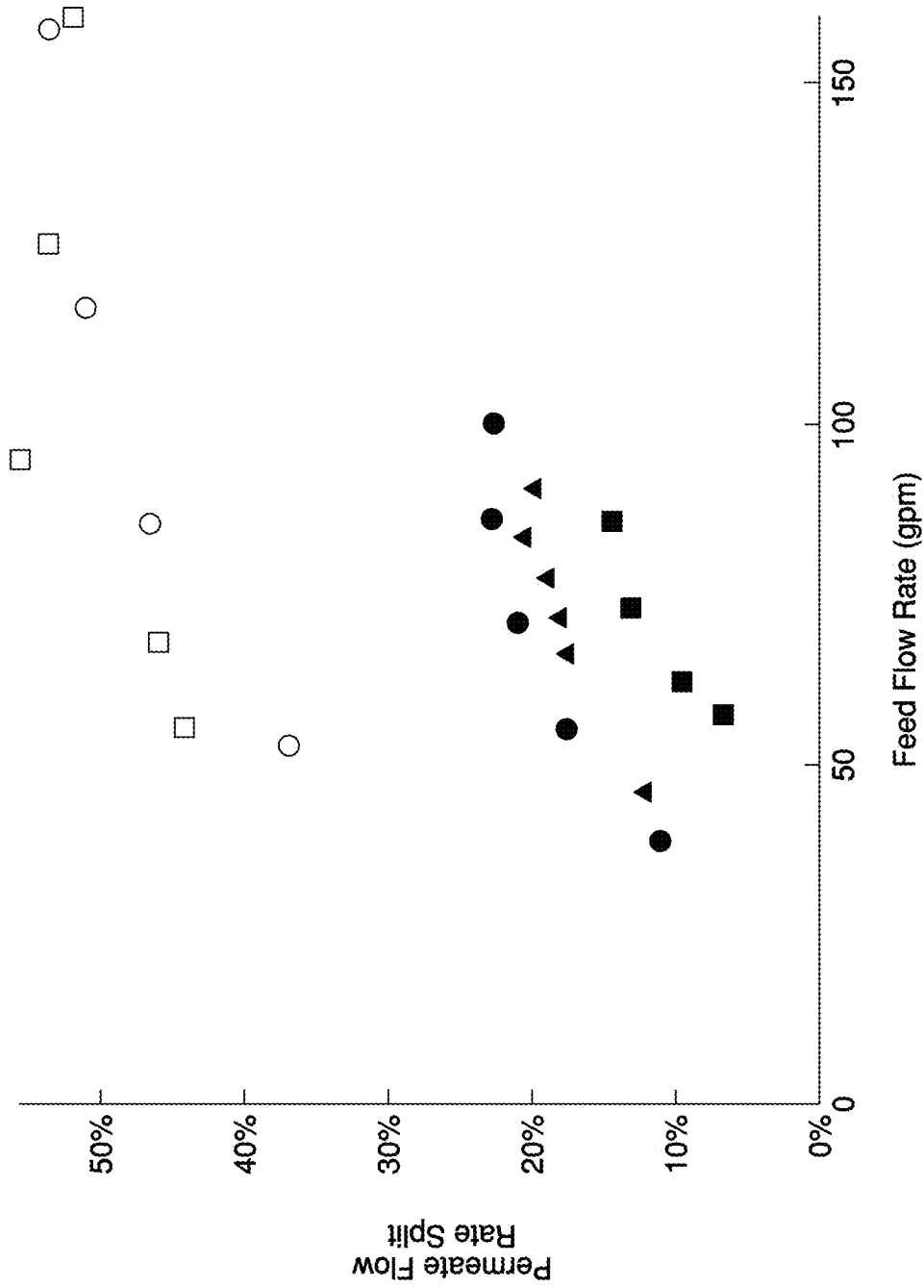
Figure 32C:
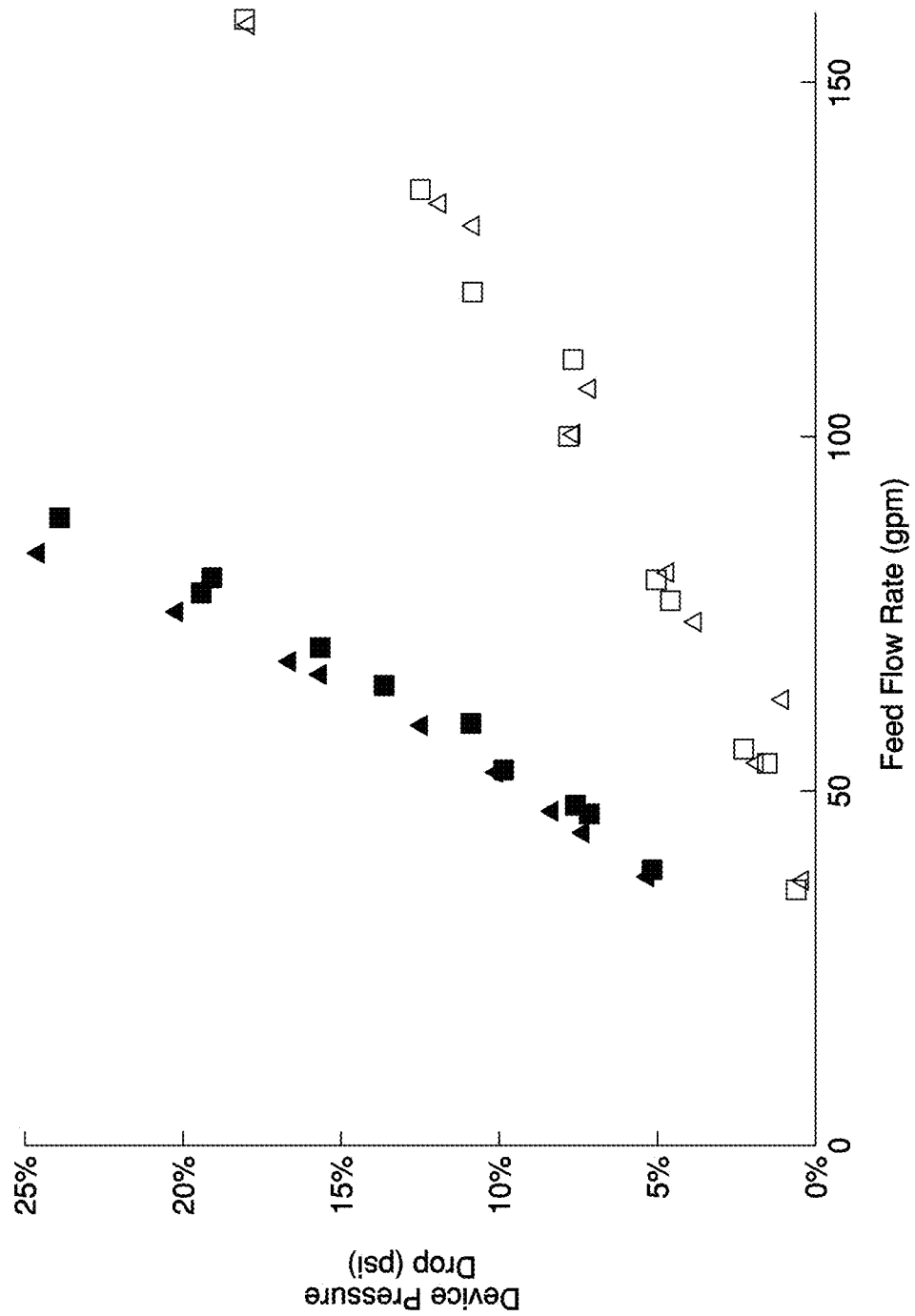
Figure 32D:
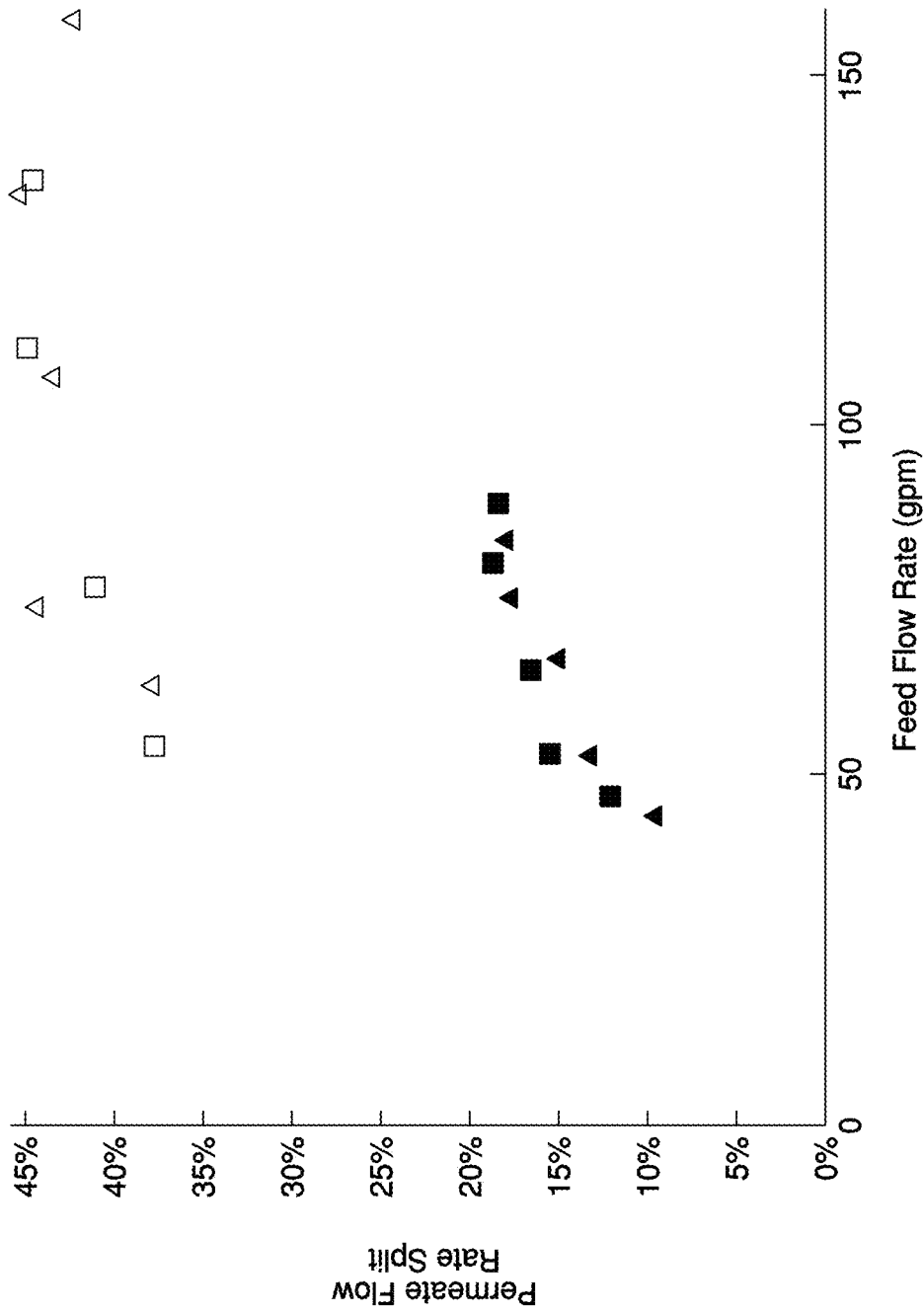

FIG. 30 is a representation of a separator assembly as part of a chemical process flow according to an embodiment of the disclosure. FIG. 31 is a representation of a separator assembly as part of a process flow according to an embodiment of the disclosure.

excess of 30 gpm for at least 12 minutes. Particles and other debris collected were washed with a water jet until no additional particles passed through the sieve. Prior to testing with this simulant, a cloudy watery dilute simulant with particle concentration >200 ppm was used.

TABLE 1

Abrasive simulant composition

| Material (Manufacturer, Product) | Density kg/L | Mass Fraction — | $d_{50}$ μm | $d_{10}$-$d_{90}$ μm | Moh Hardness — |
|---|---|---|---|---|---|
| Gibbsite (Huber, Onyx Elite 103) | 2.42 | 0.176 | 88.34 | 10.19-164.1 | 3 |
| Zeolite (ZEO Inc., Zar-Min) | 2.15 | 0.119 | 34.33 | 4.103-188.9 | 3.75 |
| $Ca_5OH(PO_4)_3$ (Jost) | 3.14 | 0.110 | 2.647 | 0.699-7.034 | 5 |
| $Bi_2O_3$ (Ferro, 320 Bismuth Trioxide) | 9.37 | 0.057 | 7.818 | 3.755-14.62 | 4.5 |
| Boehmite (Nabaltec, AOH 20) | 3.18 | 0.202 | 8.667 | 3.055-24.98 | 4 |
| Gibbsite (Huber, Onxy Elite 431) | 2.42 | 0.059 | 9.997 | 2.126-29.39 | 3.4 |
| Sand (US Silica, WG 00) | 2.65 | 0.118 | 494.7 | 306.4-779.6 | 6.5 |
| Zirconium Oxide (Durazon 360) | 5.70 | 0.158 | 9.987 | 0.948-39.52 | 8 |

While many sizes and spacings can be provided to accomplish the desired separations, some example assemblies of the present disclosure can be provided with a 300 μm offset between members. This member offset was selected, as an intermediate size in mesofluidic filtration cascades. Mesofluidic filtration systems can be configured to be an insert within a pipe (see FIG. 12). A round exterior can be selected to fit within a three inch cylinder. Accordingly, standard off-the-shelf pipes and pipe fittings commonly approved for nuclear engineering applications may be implemented to satisfy stringent safety requirements (e.g., burst pressures, containment requirements, etc.). Within the round exterior, the express lane can occupy 10±9% of the cross section while the remainder of the cross section can be considered a separator array that includes a partitioning by three parallel supports with arrays of members perpendicular to the members. The center-to-center distance between rows of members can be 3 mm with each member 1.2 mm in diameter for a design edge-to-edge gap of 1.8 mm. Over a sufficient distance (~1.18 inches) the pattern of members can repeat itself. As an example, more than twenty modules can be used so that a large particle that entered the insert away from the express lane would migrate to the express lane in the absence of turbulent or molecular diffusion with a 17% margin. Upstream of the stacked modules, ten pipe diameters were used to minimize any entrance length concerns. Downstream of the stacked modules, the express lane and remaining flows divided in a Y configuration (see FIGS. 15A-B and 16A-B for example). The final module can have a notch in place of the bottom set of members to prevent rotation of the insert within the device during operation. Welding may be used to secure one or more stacked modules. For the vertical upward flow implementations, a long thin plastic shim can be inserted away from the express lane to buttress the insert in place. This shim may be inserted in alternate locations as well.

Separator assemblies of the present disclosure can be used to separate the simulant described in Table 1 having particle sizes ranging from <0.7 to >700 μm across the design cutoff size. These simulants in water had an approximately neutral pH and did not present a radioactivity risk. After the simulant was added to the tank and after the first horizontal run, very large particles were screened from the as-prepared simulant by flowing through a 900 μm sieve at flow rates in excess of 30 gpm for at least 12 minutes.

The systems using the separator assembly can be configured as shown in FIG. 31. When the flow was initiated, the flow from the variable speed pump (Duty Master P25G33167, Reliance Electric) shunted back directly back to the tank (~460 gal filled initially to ~90%) for complete recycle (see alternating dash in FIG. 31). This step assisted the slurry in the impeller mixed tank to mix more completely prior to flow through the device and minimized abrasion wear to the plastic inserts. Inserts may be of a variety of materials including metal, plastic, ceramic, etc. A valve change then closed flow through the shunt or bypass so that flow proceeds through the mesofluidic separator. Flow through the transparent lines from the outlets of the separator was observed until these lines filled to their maximum extent, observations of bubbles minimized of ceased completely, and observers were certain that the separator was full of liquid. This observation step typically took approximately one minute. The density, flow rate, three pressures, and initial scale mass (unless tared) were then recorded. The density and flowrate were measured using a Coriolis meter, noted on FIG. 31 as a flow rate measurement (i.e., Q). Then another set of valves was activated so that the full outlet streams (dashed in FIG. 31) were diverted for ten seconds from recycle into collection vessels, at least one of which was on a scale. Ten seconds was selected to minimize uncertainty because the response time of the three-way valves are less than one second. During the diversion, the flow rate and three pressures were observed as they approached steady state and recorded. The mass of the full diversion sample from either the permeate or the express lane flows was measured using a weight balance (Combics 3, Sartorius). Once diversion was complete and values recorded, the pump flow rate was changed to the next setting. Diversion samples were not replaced, decreasing the volume of the tank as testing proceeded.

The orientation of the mesofluidic separator assembly assumed one of three positions: horizontal with express lane down, vertical with downward flow, and vertical with upward flow. The vertical configurations required additional lengths of plastic tubing beyond that required of the horizontal. When the vertical up configuration was changed to the vertical down configuration, one 90° elbow approximately two inches in diameter was removed.

After the flow ceased and testing was completed, the slurry in the vessel was allowed to settle for at least three days or until the fluid was visually clear. Then the clear fluid was removed using a peristaltic pump and the remaining solids were then dried, weighed, sieved, and particle size distribution measured.

In data analysis, the pressure drop across the device is reported as the difference between the upstream pressure and the average of the downstream pressures. Between the upstream pressure tap and the start of the separator were two elbows and several feet of flexible tubing, whose influence on pressure drop was not quantified. The volumetric flow rate was determined from the weighed mass(es) by dividing the mass by 10 s, and then dividing by the inlet density with appropriate unit conversions. Where only the permeate or express lane mass was measured, the volumetric flow rate of the other was determined by subtracting the calculated volumetric flow rate from the inlet volumetric flow rate. The permeate split is then the volumetric flow rate of the permeate divided by the inlet volumetric flow rate. The bulk Reynolds number was determined using $$\mathrm{Re}_D = \frac{Dv_b}{v}, \quad (1)$$

where D is the tube inner diameter, $v_b (=4 Q/(vD^2))$ is the bulk cross sectional average, Q is the volumetric flow rate, and v is the kinematic viscosity of the slurry. The express lane and permeate velocities were calculated from the volumetric flow rates each divided by their respective cross sectional areas determined at the Y. The velocity in the gap, $v_G$, was determined by dividing the permeate velocity by the gap width, G, and multiplying by the member center-to-center distance. The gap Reynolds number is then $$\mathrm{Re}_G = \frac{Gv_G}{v}. \quad (2)$$

In this manner, the pressure drop, permeate split, bulk Reynolds number, and gap Reynolds number were determined.

Here, we explore an industrial scale mesofluidic filtration system at fast flow rates. Because prior work was performed with spherical beads, large particle separation is evaluated for abrasive aspherical particles typical of abrasive radioactive waste. We explore the pressure drop, split in flow rates between permeate and filtrate, and the fraction of large particles in the permeate line each as a function of flow rate for three separator orientations. We evaluate the pipe and gap Reynolds numbers relative to those reported elsewhere to place these results in context.

A key feature of this separator design is the circular form factor that fits within a three inch tube. This is important because its small footprint permits easy integration into existing industrial piping systems. The three inch test system was selected as a geometric control against nuclear criticality but larger systems for a variety of industries are feasible. The circular form factor contrasts with arrays that have been constructed as planar systems with rectangular cross sections. Because the array of pillars is intricate, this system is designed and constructed using additive manufacturing to fit within a pipe three inches in diameter.

With respect to FIGS. 32A-32D, inlet flow rate data with horizontal results for (a) pressure drop and (b) fraction of flow through the permeate versus feed flow rate. Circles indicate dilute simulant, squares indicate concentrated simulant, and triangles indicate conditioned simulant with particles in excess of 0.9 mm mostly but not completely removed, while closed symbols indicate that the inserts were installed and the open symbols indicate that the inserts were absent. Vertical results for (c) pressure drop and (d) fraction of flow through the permeate versus feed flow rate. Squares indicate downward flow and triangles indicate upward flow, while closed symbols indicate that the inserts were installed and the open symbols indicate that the inserts were absent.

With the inserts in dilute simulant, a maximum flow rate of 100 gpm was achieved at the pump's maximum output. Although this simulant was rather dilute, it was sufficiently concentrated to make the solution cloudy. With the more concentrated solution, a maximum flow rate of 90 gpm was achieved. These volumetric flow rates correspond to bulk inlet velocities in the range of 0.4-2.5 m/s, which are as fast as and faster than any explored experimentally. These flow rates may only be limited not by the device but by the pump, suggesting that, while these tests have not determined an upper maximum velocity achievable by this technology.

Perhaps the most surprising finding is that the plastic members survived an abrasive simulant over several hours of testing. However, on member mortem analysis, the only members that broke were those that failed as the inserts were assembled together into the test stand or upon removal but not during flow. While the assemblies can be constructed of polymeric material including industrial plastics alone, metal materials can be used as well in industrial systems and may have greater resistance to both fluid drag and mechanical installation forces.

FIGS. 32A-32D also show that the pressure drop increases approximately quadratically with flow rate. The portion of the flow rate that passes through the permeate increases with flow rate. In the absence of the inserts, the proportion of the flow is nearly equal. However, with the inserts, the proportion drops substantially to typically 10-25% of the flow. Even as fluid motion presents a drag force to the members, the members provide a drag force to the fluid, increasing the resistance of the separator relative to the express lane. This flow attenuates more quickly when large particles ($>d_{90}$) occlude the separator face (these particles would be removed upstream in cascaded devices). However, when the larger particles are removed (here >0.9 mm), the proportion of the flow through the permeate appears to depend but weakly on particle concentration (compare closed triangles and circles in FIG. 32B).

Figure 33A:
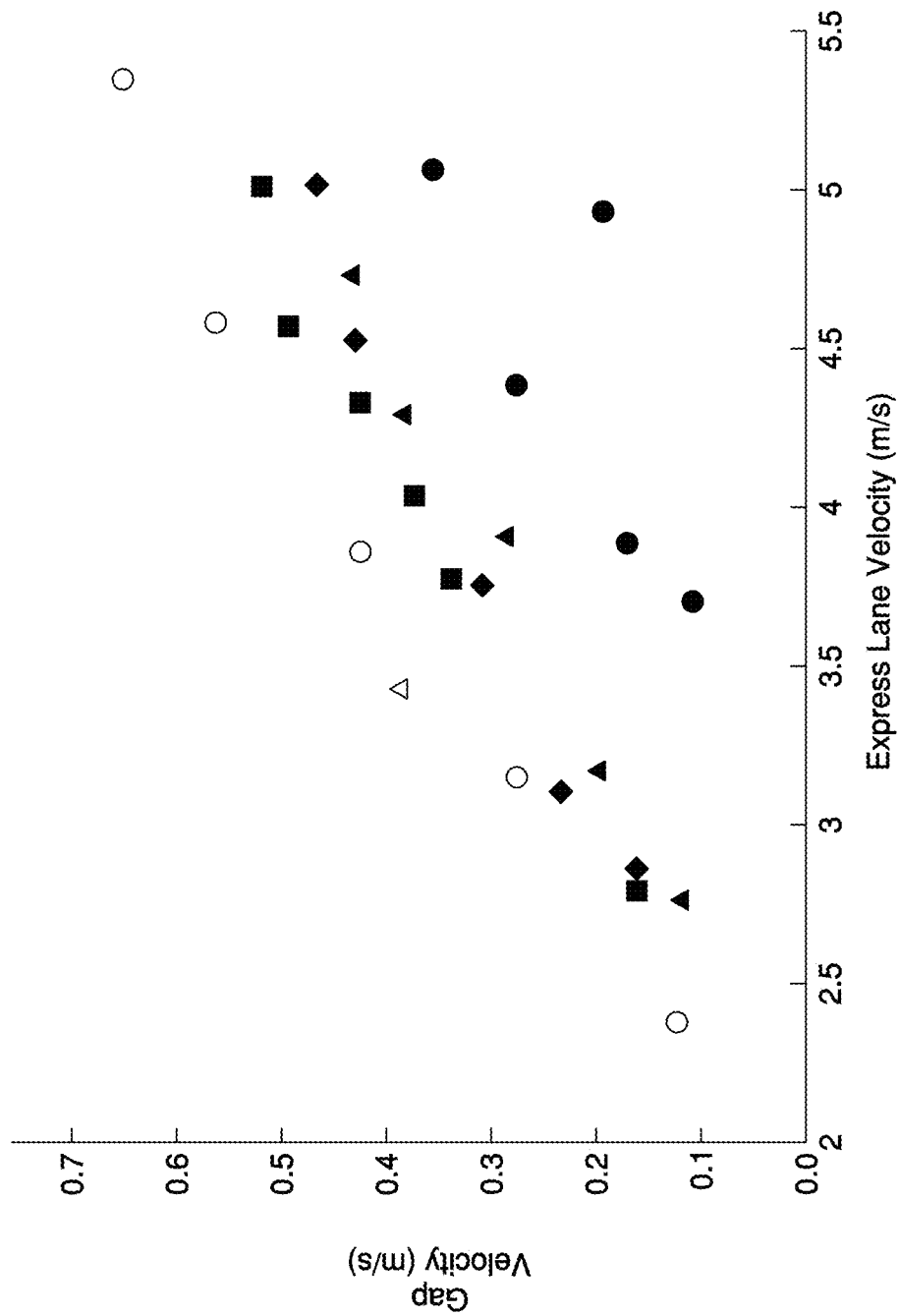
FIGS. 33A-33B are representations of data acquired utilizing separator assemblies according to embodiments of the disclosure.

FIG. 33A compares the spatial average velocity through the express lane to the spatial average velocity across the gap. The flow rates in the gap remain relatively modest between ~0.1-0.7 m/s in contrast to the flow rates through the express lane that remain between 2.4-5.4 m/s (7.8-17.7 ft/s). These flow rates through the express lane more than suffice to drive particle through the express lane without the formation of a fixed bed. This is commensurate with the observation of transient particle beds in transparent sections from both express lane and permeate flows. Often the flows were sufficiently fast so that a bed was not observed at all but the color across the transparent sections was homogeneous. These observations suggest that settled solids observed in outlet streams once flow ceased formed after flow stopped.

Figure 33B:
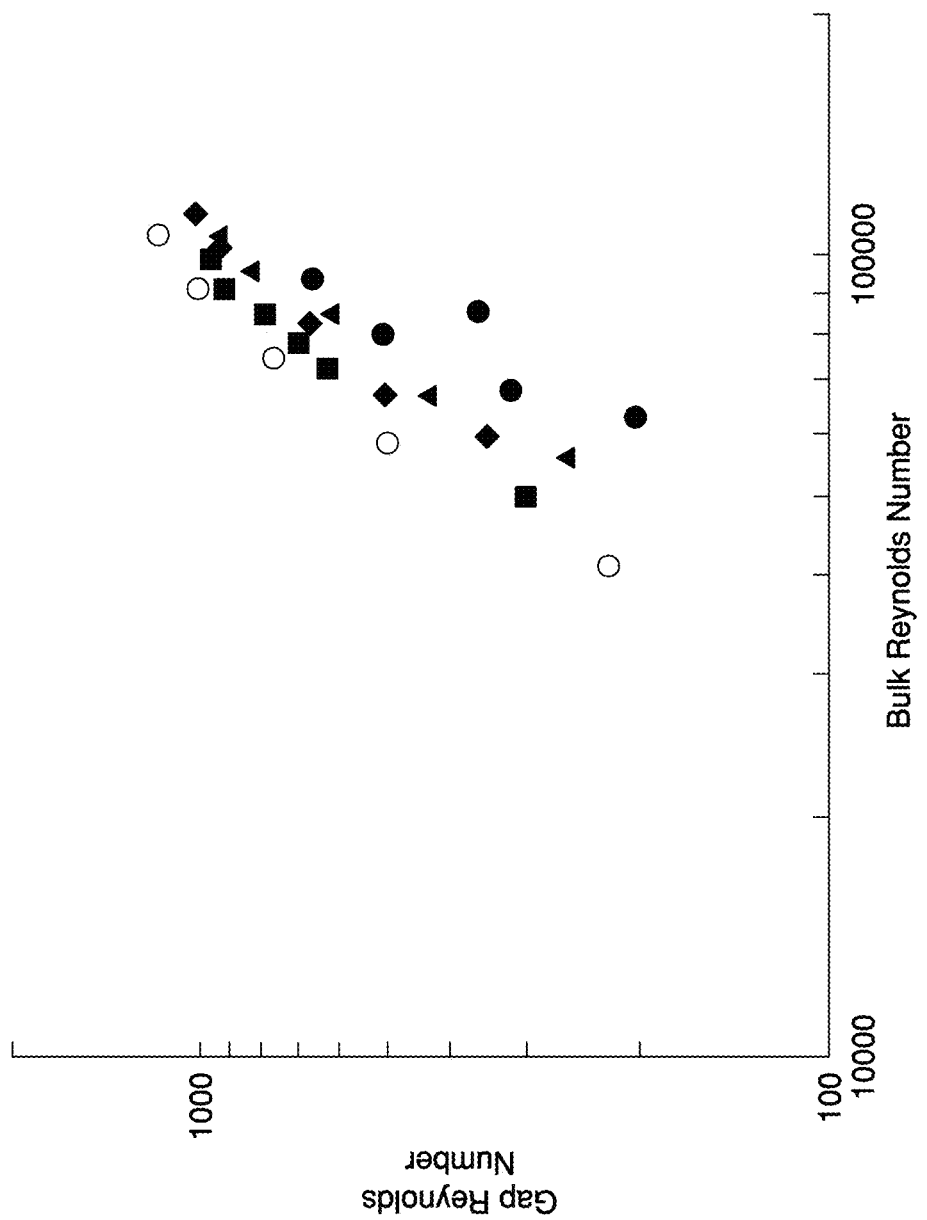
Figure 34A:
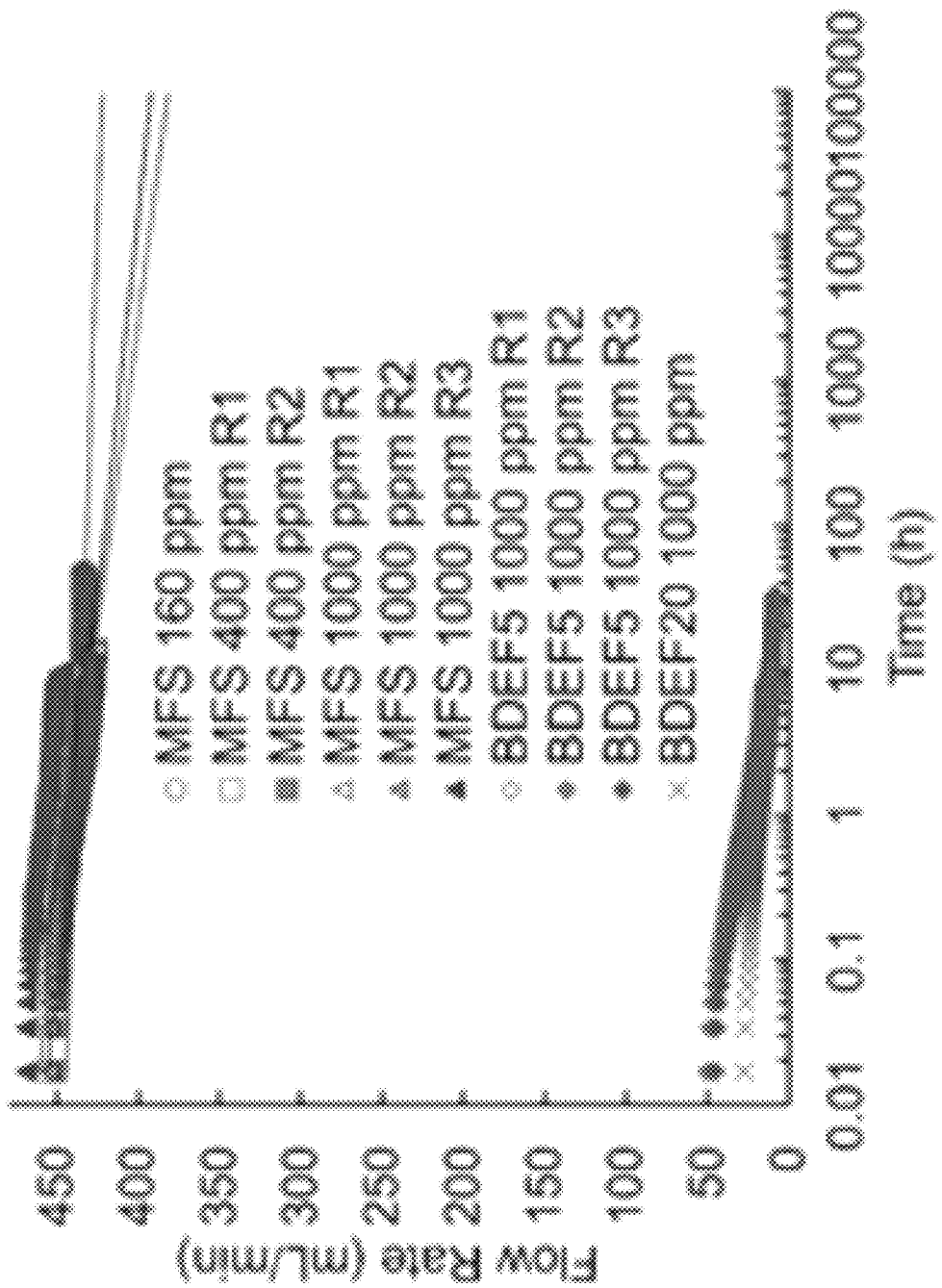
FIGS. 34A-34D represent data acquired utilizing separator assemblies according to an embodiment of the disclosure.
Figure 34B:
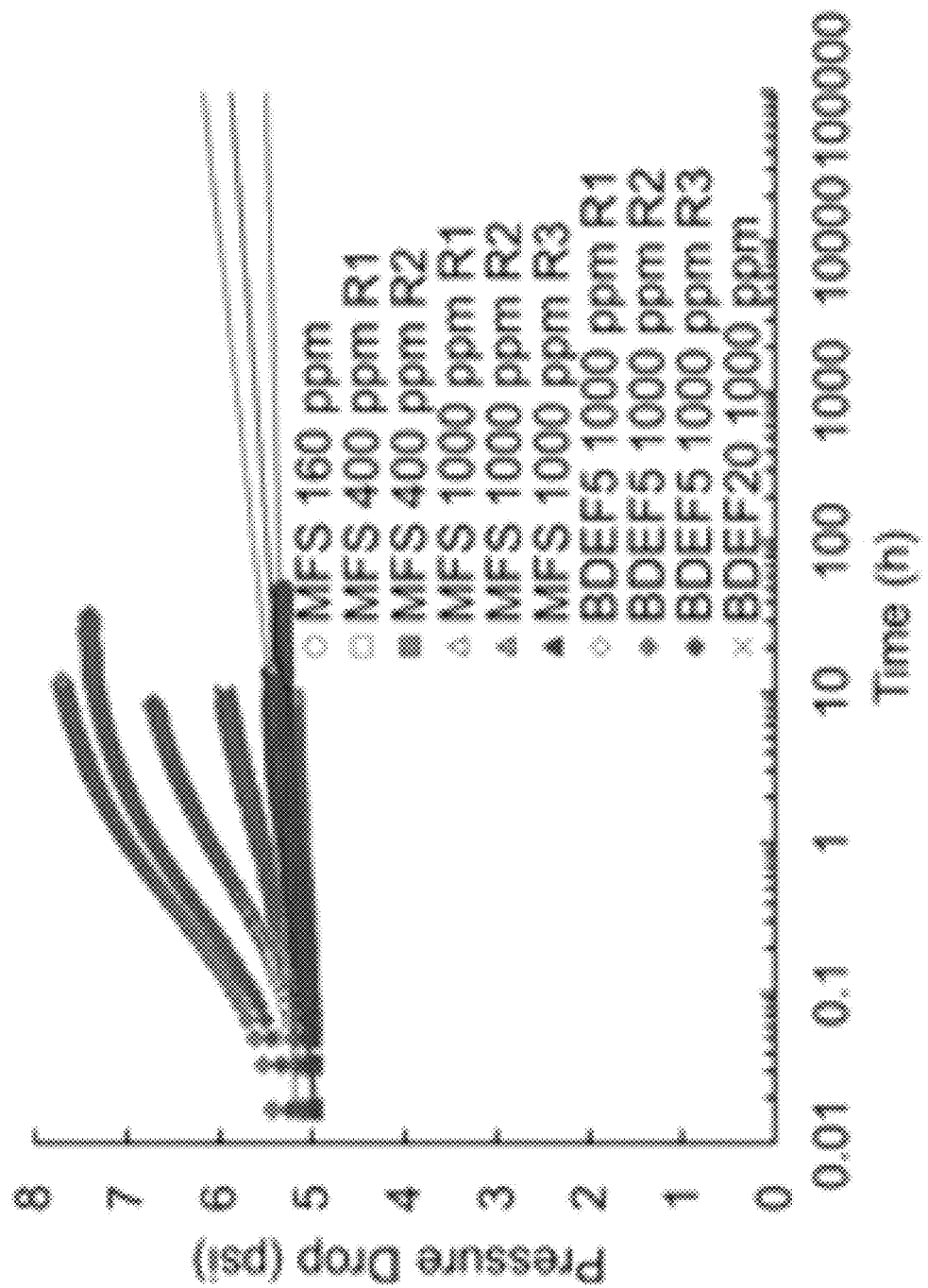
Figure 34C:
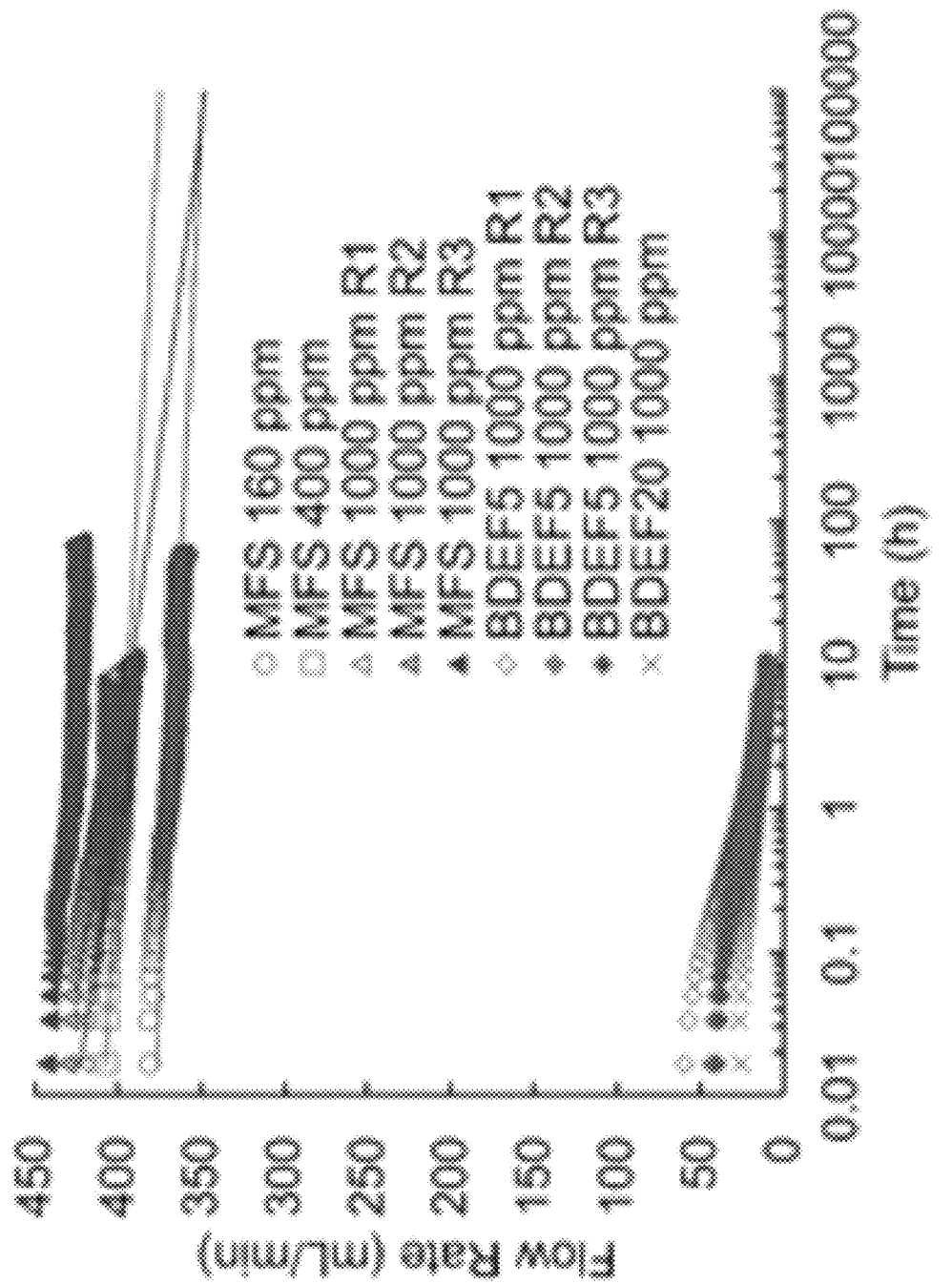
Figure 34D:
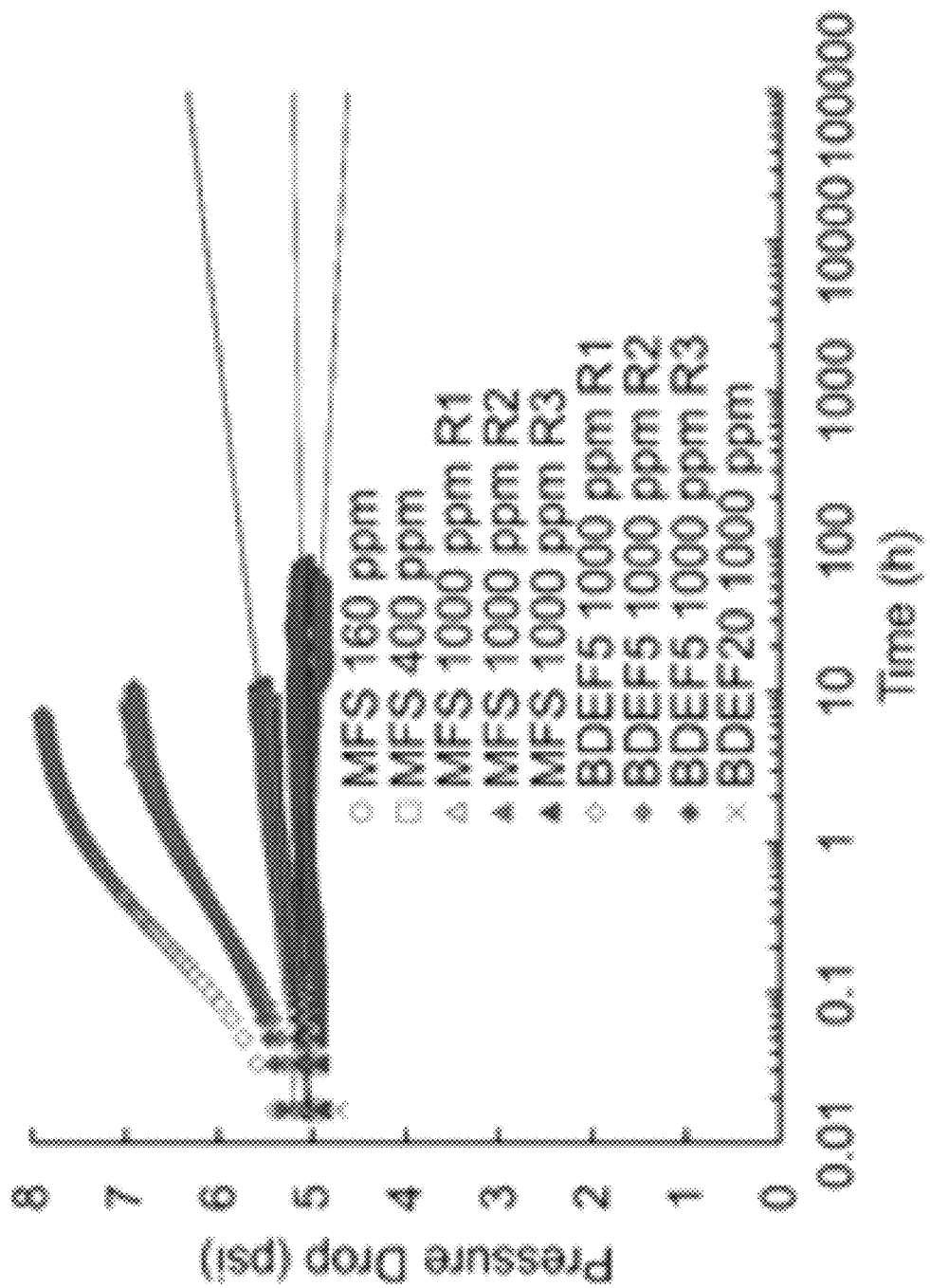

FIGS. 33A and 33B provide average velocity across the gap versus average velocity across the express lane and gap Reynolds number versus bulk Reynolds number. Circles and squares indicate the horizontal orientation with express lane down, triangles indicate the vertical configuration for upward flow, and diamonds indicate the vertical configuration for downward flow with dilute simulant open and concentrated simulant closed. The square symbol indicates conditioned simulant with very large particles (>0.9 mm) removed.

FIG. 33B summarizes these results in terms of two important Reynolds numbers. The bulk Reynolds number, $Re_D$, is the typical Reynolds number based on the tube diameter and unobstructed inlet flow rate. This figure shows that the Reynolds numbers all exceed the laminar-turbulent transition by at least an order of magnitude. This is important because it indicates that the flow entering the device is turbulent. This contrasts with prior efforts where inlet flows were decidedly laminar, but is commensurate with many industrial applications where turbulence is commonplace. The second Reynolds number is the gap Reynolds number based on the critical dimension of the edge-to-edge distance between members (here ~1.8 mm) and the average velocity across the gap.

FIG. 32A-32D also highlight the influence of tube orientation. When flow is oriented parallel to the gravitational vector, particle separation occurs predominantly if not exclusively by size. When the flow vector has a component normal to the gravitational vector, gravitational settling may drive particles to cross stream lines with larger and denser particles settling faster. The net result of orientation shows that large particle removal is more effective in the horizontal configuration with express lane down because higher density particles enter the express lane due to both the filtration mechanism and gravitational settling.

Slurries with larger and higher density particles may be separated in shorter sequences or cascades. For example, in nuclear waste processing at Hanford, a screen on the pump inlet prevents particles larger than $3/8^{th}$ of an inch from entering the pump and piping system. In the absence of a gravitational assist, the several separation stages (consecutively arranged within the same pipe) would be required, where the design cutoff of the current stage determines the minimum member spacing in the next. However, with gravitational assist fewer separation stages would be needed to achieve the same performance.

Nevertheless, the difference between up and down orientations is minimal. There is a slight decrease in pressure drop from upward flow to downward flow, but this comports with the removal of a single 90° bend between the two test cases. We note that there is an important cutoff velocity for the vertical upward flow condition. The upward drag force must meet or exceed the gravitational settling force for the particle to continue upward through the device. Based on the settling expression of Camenen (2007), the flow rate Q that balances this condition is given by $$Q = \frac{\pi}{4} D^2 \frac{vG}{dfD_{cc}} \left( \sqrt{15 + \sqrt{\frac{g(s-1)d^3}{0.3v^2}}} - \sqrt{15} \right)^2, \quad (3)$$

where D is the pipe diameter, v is the kinematic viscosity of the slurry, G is the gap, d is the particle diameter, f is the fraction of the cross section through the permeate, $D_{cc}$ is the center-to-center distance between members, g is the gravitational constant, and s is the specific gravity of the particle. For sand in Table 1, the critical flow rate is only 10 gpm, so that this criterion is relatively modest. On member evaluation at the end of testing of the vertical upward flow configuration, particles were observed throughout the device, but they may have passed through the device after the flow had been turned off when residual fluid was drained. A back flow preventer is contemplated.

The separator performs consistently across flow rates up to 90 gpm with modest pressure drop even though the inlet flow was turbulent and vortex shedding is likely within the member arrays.

Additionally, two chemical simulants were employed with compositions presented in Tables 2-3. Both caustic slurry simulants were representative of wastes, which are stored at highly basic conditions to minimize tank wall corrosion. Neither simulant presented radioactivity risk. The salt cake simulant was prepared for testing by filling the reservoir with 10.8 kg of the supernatant from mixed simulant that had been filtered through a 0.45 µm filter. The retained solids were filtered through a 106 µm filter. To achieve a ~160 ppm simulant, 40.5 g of particles <106 µm were added. The simulant was sheared in the test system for at least 5 minutes prior to testing. To achieve a ~400 ppm simulant, an additional 60.7 g of particles <106 µm were added. To achieve a ~1000 ppm simulant, an additional 148.9 g of particles <106 µm were added.

Similarly, the $FePO_4$ simulant was prepared for testing by filling the reservoir with 17.8 kg of the supernatant from mixed simulant that had been filtered through a 0.45 µm filter. To achieve a ~160 ppm simulant (on an $Fe(OH)_3$ basis), 2.83 g of iron phosphate were added. This simulant was sheared overnight prior to testing. To achieve a ~400 ppm simulant, an additional 4.20 g of iron phosphate were added. To achieve a ~1000 ppm simulant, an additional 10.6 g of iron phosphate were added. In both cases, weight fractions do not account for further solubilization of solids, and when samples were removed their contents were not replaced. The as-made salt cake simulant chemical simulant is given in Table 2. This composition is prior to sieving with a 106 micron sieve.

The test system had two parallel flow loops (see FIG. 31). In the main flow loop, simulant in a feed tank was fed to a steady pump that drove flow through a cross flow filtration unit that only provided flow resistance, and then back to the feed tank. An interior loop that contained the filter tested diverged after the pump and merged back at the feed tank. An in-line Coriolis mass flow controller measured flow rate and TC probe the temperature. A differential pressure meter indicated the pressure drop across the filtration system along with downstream tubing. The system was operated with the mesofluidic separator in a horizontal configuration with express lane down. The dead-end filters selected for this analysis were the Mott grade 5 and grade 20 filters available commercially, because their nominal sizes span that anticipated with the mesofluidic separator device.

TABLE 2

S-salt cake chemical simulant composition.

| Species | Concentration |
| --- | --- |
| Aluminum (Al) | $2.81 \cdot 10^{-1}$ mol/L |
| Chromium (Cr) | $1.0310^{-2}$ mol/L |
| Nitrate ($NO_2$) | $8.1810^{-1}$ mol/L |
| Nitrate ($NO_3$) | 1.93 mol/L |
| Phosphate ($PO_4$) | $8.80 \cdot 10^{-2}$ mol/L |
| Sulfate ($SO_4$) | $8.29 \cdot 10^{-2}$ mol/L |
| Inorganic carbon (C) | $5.21 \cdot 10^{-1}$ mol/L |
| Fluoride (F) | $5.79 \cdot 10^{-3}$ mol/L |
| Chloride (Cl) | $9.10 \cdot 10^{-2}$ mol/L |
| Hydroxide (OH) | $7.17 \cdot 10^{-1}$ mol/L |
| Potassium (K) | $2.92 \cdot 10^{-2}$ mol/L |
| Sodium (Na) | 5.11 mol/L |

TABLE 2-continued

S-salt cake chemical simulant composition.

| Species | Concentration |
| --- | --- |
| Gibbsite (Almatis C333) | 0.394 g/g |
| Boehmite (APYRAL AOH20) | 0.089 g/g |
| Cancrinite | 0.067 g/g |
| Grimaldiite | 0.152 g/g |
| Sodium Oxalate | 0.141 g/g |
| Sodium Phosphate Dodecahydrate | 0.128 g/g |
| Iron Rich Sludge | 0.029 g/g |

TABLE 3

Nominal sodium chemical simulant composition.

| Species | Concentration |
| --- | --- |
| $Al(NO_3)_3$—$9H_2O$ | 0.17 mol/L |
| NaOH (50% solution, w/w) | 4.15 mol/L |
| $CsNO_3$ | 0.00010 mol/L |
| KCl | 0.12 mol/L |
| $Na_2SO_4$ | 0.066 mol/L |
| $NaNO_2$ | 1.02 mol/L |
| $NaNO_3$ | 1.28 mol/L |
| $Na_3PO_4$—$12H_2O$ | 0.043 mol/L |
| $Na_2CO_3$—$H_2O$ | 0.47 mol/L |
| $Na_2C_2O_4$ | 0.013 mol/L |
| Water, Deionized | 41.51 mol/L |
| This simulant is termed 5.6M Na (nominal) LAWPS filtrate | |

Prior to a test run, flow was initiated through the main flow loop. After that flow achieves steady state, flow in a mesofluidic filtration device (MFS) loop was initiated. The pump flow rate was initially pulsed above the target flow rate and device tapped to drive out any bubbles that may be present in the system. The transparent tubing from the MFS to the tank was observed to ensure that bubbles ceased. The variable frequency driven pump can be tuned so that the pressure drop started at 5 psi. The temperature of the heat exchanger was then manually set to maintain the temperature at ~20° C., because prior experience with chemical slurry simulants suggested temperature sensitivity. The system operated without further operator intervention except where regular temperature checks suggested manual adjustment of the heat exchanger. In this manner, both the pressure and flow rate may vary during the course of the experiment. The data acquisition system (DAS) recorded the pressure and flow rates across and through the device as a function of time. Data was collected each 2.5 seconds (0.4 Hz), 60 s averages therefore were reported here. Data analysis began one minute after the pressure was set to approximately 5 psi and other flow adjustments were complete, because 60 s averages were reported.

The system was operated with both outlet streams exiting into the tank for a complete recycle. In this manner the flow rate and pressure drop vary as a function of time for at least 7 hours. The minimum duration was selected because a majority of the attrition occurs in these early times and because the back-pulsed dead end filtration (BDEF) has been shown to cake the volume of the entrance line to this filter in approximately ~7 hours. The MFS was permitted to run longer as opportunity permitted.

A feed sample was collected once for each concentration from the outlet of the mixing tank at the start of the run. At the end of the test, samples of the feed, permeate, and express lane were collected from the lines as they entered the mixing tank. These lines were located above the liquid level in the tank to keep device outlet pressure at ambient pressure. Flow to the express lane was also collected for one minute while monitoring the flow entering the MFS to determine the flow rate splits to permeate and express lane.

The dead-end filter was evaluated similarly. The commercial off-the-shelf filter selected for comparison was a sintered Mott grade 5, in-line filter (6480-1/2-6-10-AB) with a 6 inch long and 3/8 inch 316LSS porous filter housed in a 1/2 inch pipe made of 316SS.

FIGS. 34A-34D compare and contrast the performance an additively manufactured mesofluidic separator system to a commercially available dead-end filter as a flow rate through the filtration system as a function of time. In each case, the system was set to 5 psi regardless of flow rate without further adjustment so that both pressure and flow rate were permitted to evolve over time. The dead-end filters show a fairly rapid drop in throughput as a function of time. Both Mott filters, grades 5 and 20 that span the nominal size cutoff of the mesofluidic separator, drop quickly losing 57-78% of their flow and increasing 18-39% in pressure drop within the first seven hours. These changes are consistent with cake fouling, though some depth fouling may also play a role. In contrast, the mesofluidic device shows a 3-5% drop in the flow rate and an increase in pressure drop of ≤6.5% over the same seven hour window. Fitting the mesofluidic separator flow rate data to a logarithmic curve shows that a line on a log-linear plot represents the mesofluidic data reasonably well and projects that this device will retain >89% of its flow rate over three months and >87% of its flow over three years (Table 4). Similarly, the fitting of the mesofluidic separator pressure data to a logarithmic curve shows reasonable agreement and projects that this device's pressure drop will rise by ≤14% of its flow rate over three months and <17% over three years (Table 5). The dead end filters would not be serviceable after 3 months of operation much less three years and increase in pressure drop over 7 hours approximately as much as the MFS filter does in three years.

The simulants were specifically chosen because they are known to clog filter systems with some rapidity. Indeed, the 7 hour interval was chosen for comparison because the annular space immediately upstream of the BDEF filter fills completely within this interval. Retaining flow for days, months and years suggests that flushing and replacement protocols may be much less frequent if not completely unnecessary with the mesofluidic filtration systems in contrast to dead-end filtration systems. There does appear to be a modest difference between the two simulants. The curves for the $FePO_4$ simulant overlap in contrast to the curves for the salt cake simulant that data in contrast opens up more each time. This suggests that whereas the sticky $FePO_4$ simulant may have been protective during the cleaning steps (unnecessary during regular operations), the S-salt cake was not protective of the Hanes 282.

TABLE 4

Flow rate comparisons and projections

| Device | Simulant | Concentration ppm | 7 h % diff | 3 mo % diff | 3 yr % diff |
|---|---|---|---|---|---|
| MFS | Salt Cake | 160 | −4.4% | −6.8% | −7.9% |
| MFS | Salt Cake | 400 | −3.1% | −6.1% | −7.4% |
| MFS | Salt Cake | 1000 | −5.8% ± 1.5% | −10.4% ± 4.3% | −12.3% ± 5.4% |
| BDEF Grade 5 | Salt Cake | 1000 | −76.7% ± 2.9% | Not Possible | Not Possible |
| BDEF Grade 20 | Salt Cake | 1000 | −57.8% | Not Possible | Not Possible |
| MFS | $FePO_4$ | 160 | −3.8% | −5.5% | −6.3% |
| MFS | $FePO_4$ | 400 | −4.6% ± 1.5% | −9.7% ± 3.5% | −11.9% ± 4.4% |
| MFS | $FePO_4$ | 1000 | −5.0% ± 0.8% | −10.5% ± 1.5% | −12.9% ± 1.8% |
| BDEF Grade 5 | $FePO_4$ | 1000 | −72.4% ± 5.2% | Not Possible | Not Possible |
| BDEF Grade 20 | $FePO_4$ | 1000 | −61.4% | Not Possible | Not Possible |

TABLE 5

Pressure comparisons and projections

| Device | Simulant | Concentration ppm | 7 h % diff | 3 mo % diff | 3 yr % diff |
|---|---|---|---|---|---|
| MFS | Salt Cake | 160 | −0.2% | −5.4% | −7.3% |
| MFS | Salt Cake | 400 | 2.0% | 3.3% | 3.9% |
| MFS | Salt Cake | 1000 | 7.1% ± 1.4% | 12.0% ± 6.4% | 14.2% ± 8.5% |
| BDEF Grade 5 | Salt Cake | 1000 | 39.7% ± 10.7% | Not Possible | Not Possible |
| BDEF Grade 20 | Salt Cake | 1000 | 28.7% | Not Possible | Not Possible |
| MFS | $FePO_4$ | 160 | 4.8% | 6.6% | 7.6% |
| MFS | $FePO_4$ | 400 | 6.2% ± 2.4% | 12.9% ± 5.5% | 15.8% ± 6.9% |
| MFS | $FePO_4$ | 1000 | 6.5% ± 0.9% | 13.2% ± 1.1% | 16.1% ± 1.2% |
| BDEF Grade 5 | $FePO_4$ | 1000 | 38.9% ± 6.4% | Not Possible | Not Possible |
| BDEF Grade 20 | $FePO_4$ | 1000 | 18.5% | Not Possible | Not Possible |

Figure 35A:
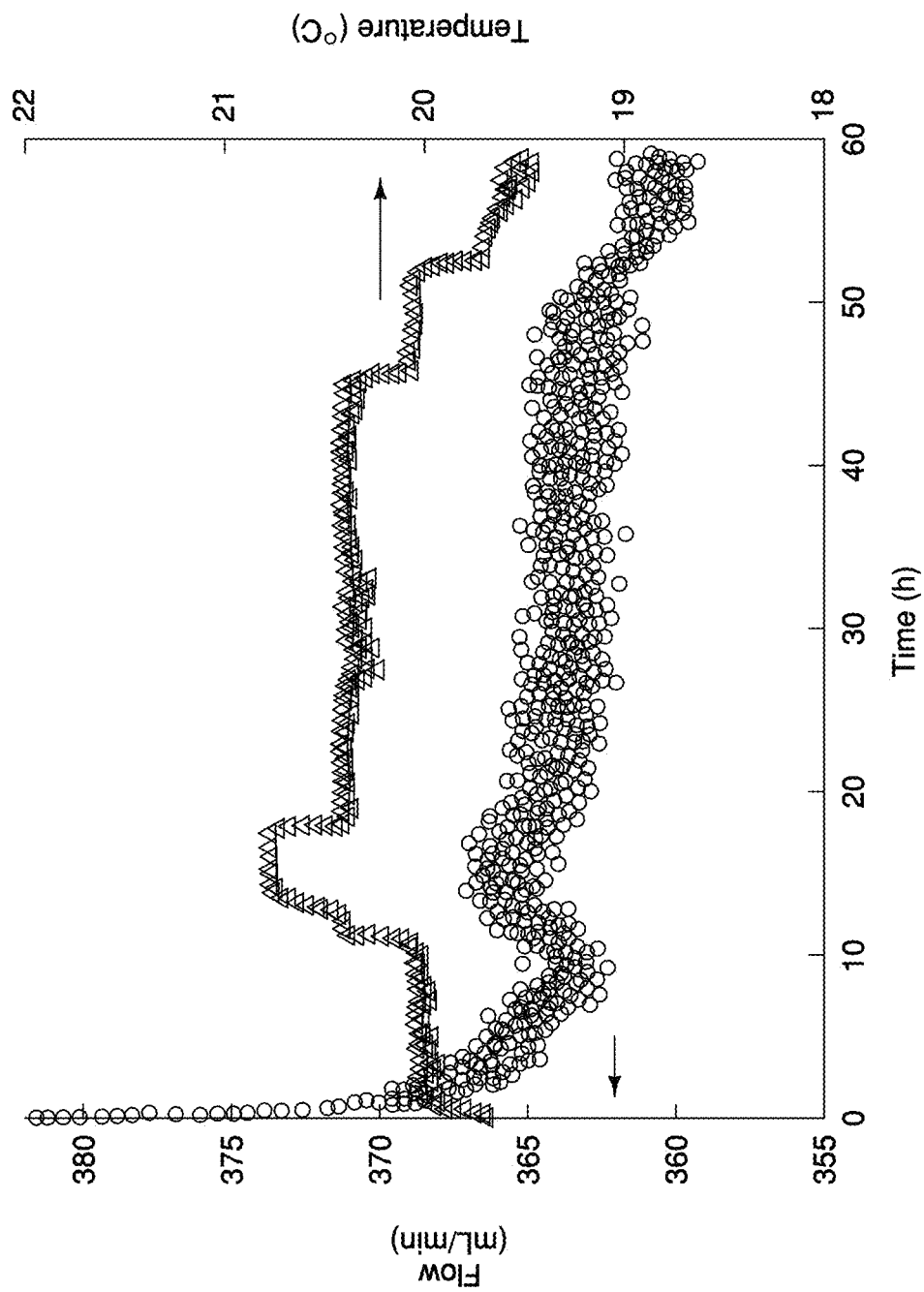
FIGS. 35A-35B represent data acquired utilizing separator assemblies according to an embodiment of the disclosure.
Figure 35B:
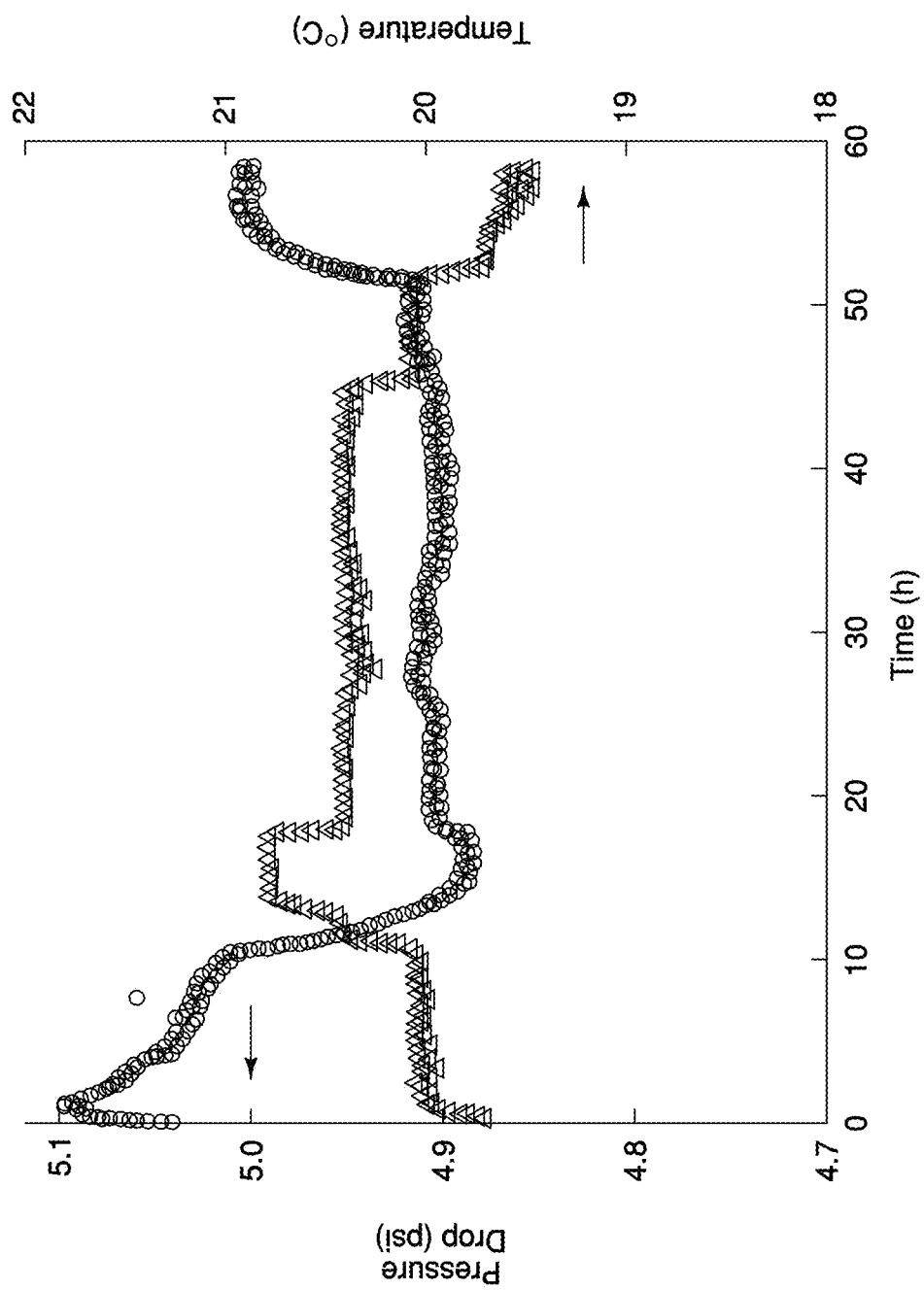

Like some chemical simulants, the extent of particle attraction between the metal of the MFS and the simulant particles may be temperature sensitive. To the extent that the DLVO theory applies, both the lumped van der Waals force and electrostatic force are modestly temperature dependent as is the drag force acting on attached particles through viscosity. The net result of these temperature sensitivities is shown in FIGS. 35A-B. After the exponential drop in flow rate, as the temperature goes up the flow rate goes up and as the temperature drops, the flow rate drops. The pressure is similarly dependent on the temperature as the pressure goes down when the flow rates up. These variations contribute to the uncertain predictions of pressure drop decreases over time for the S-salt cake at 160 ppm, though other conditions appear to be less sensitive and the variations are quite small. Like many industrial environments, the temperature is checked and adjusted manually (e.g., bang-bang control) as necessary but not necessary finely tuned with advanced temperature control systems. Please note that the temperature differences are subtle but influential as temperature spans of under 2° C. appear to affect small variations in the profiles.

Although the express lane occupies a minority of the cross section of flow, nearly half of the flow exits out the express lane. For the salt cake simulant over a range of flow rates from 361-424 mL/min, flow through the permeate captured only 60.2±0.6% (1σ) of the entering flow. For the $FePO_4$ simulant over a range of flow rates from 426-448 mL/min, flow through the permeate captured only 60.6±0.7% (1σ) of the entering flow. In both cases, no clear trend in flow rate split versus flow rate was observed, and the flow exiting through the permeate line was much less than would have been suggested by the cross sectional area alone. The flow rate split is independent of concentration at these relatively modest concentrations (160-1000 ppm).

For these conditions, the entering Reynolds number based on the hydraulic diameter ranges over 162-202, well within the laminar inertial flow regime. The corresponding gap Reynolds number spans 21-25. They show that the critical diameter drops to 80-85% of that of creep flow, so that a critical diameter of 20 μm based on creep flow conditions would be expected to fall to ~16-17 μm, within the nominal Mott grade 5 and grade 20 bound.

Figure 36:
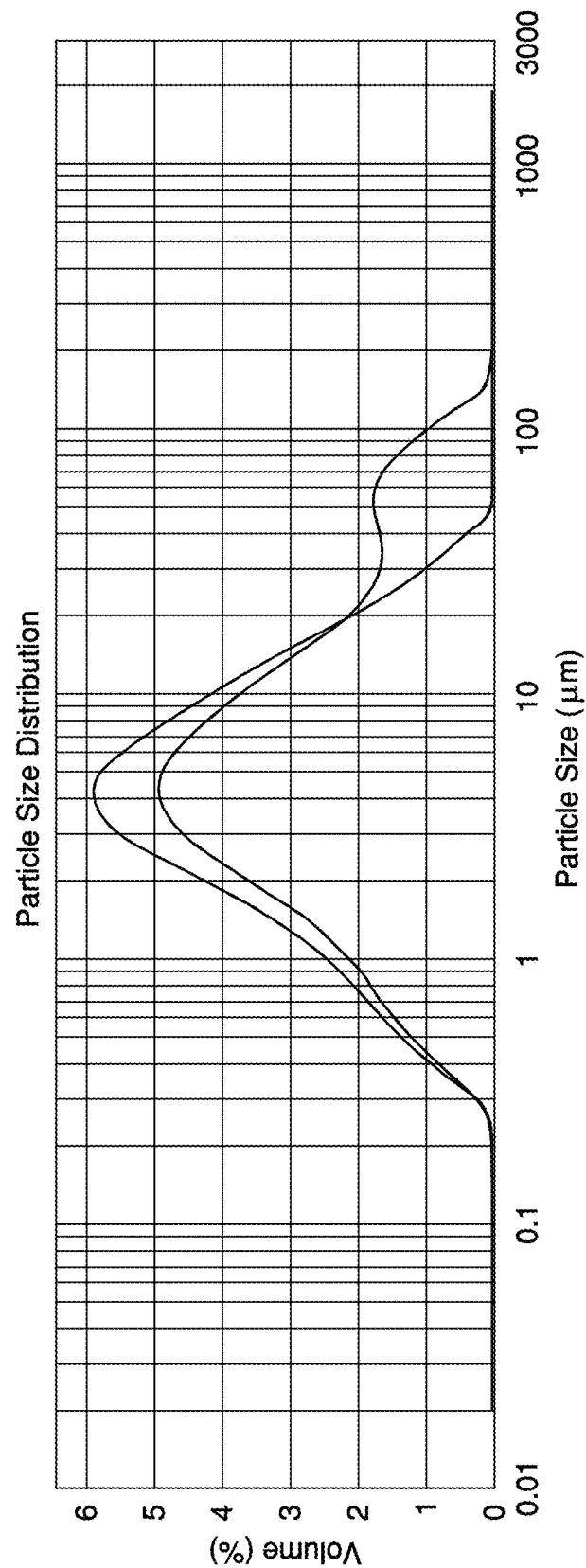
FIG. 36 represents data acquired utilizing separator assemblies according to an embodiment of the disclosure.

To further evaluate separator performance, FIG. 36 compares the particle size distributions for express lane and inlet and outlet compositions. The distributions are similar (perhaps with rescaling) for sizes below 10 μm. However, above 10 μm, the express lane distribution has a shoulder from ~20-130 μm. This shoulder is completely absent in permeate distributions, indicating that the separation does indeed become effective around 16-17 μm as suggested above.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for separating solid particles of differing sizes, the method comprising:
providing a solution comprising solid particles of differing sizes to a mesofluidic separator assembly at a rate of at least 1 gallon per minute, the mesofluidic separator assembly comprising at least one separator module comprising a conduit defining at least one cross sectional area and configured to facilitate the flow of solution along a horizontally aligned pressure differential axis through the conduit, the separator module defining at least two portions in the at least one cross sectional area, an upper portion of the at least two portions having members extending between sidewalls of the conduit, the members being circular in at least one cross section and arranged in rows and columns to define juxtaposed levels of members in at least one cross section, and a lower portion of the at least two portions being open to provide an expressway, the upper portion being vertically aligned above the lower portion, wherein the lower portion occupies the lowest most portion of the conduit; and flowing the solution through the separator assembly to transport smaller solid particles within the upper portion and transport larger solid particles in the expressway of the lower portion to separate the smaller solid particles from the larger solid particles.

2. The method of claim 1 further comprising using the juxtaposed levels of members to direct the larger solid particles to the expressway.

3. The method of claim 2 wherein the smaller particles are substantially retained within the upper portion.

4. The method of claim 3 further comprising accumulating the larger solid particles in the lower portion.

5. The method of claim 4 further comprising providing the separated larger solid particles through the expressway and out of the one separator module to an expressway conduit in fluid communication with the expressway of the separator module.

6. The method of claim 4 further comprising providing the separated smaller solid particles to a smaller particle conduit in fluid communication with the upper portion of the separator module.

7. The method of claim 1 wherein the members extend normal to the pressure differential axis in the at least one cross section.

8. The method of claim 1 wherein the solution is provided to the mesofluidic separator assembly at a rate of from 1-100 gallons per minute.

9. The method of claim 1 wherein the cross sectional diameter of the conduit is less than 3 inches.

10. The method of claim 9 wherein the solution is provided to the mesofluidic separator assembly at a rate of 1-100 gallons per minute.

11. The method of claim 1 wherein at least some of the solid particles are greater than 600 μm.

12. The method of claim 1 wherein the cross sectional area of the expressway is 1-20% of the entire cross sectional area of the conduit.

13. The method of claim 1 wherein at least some of the solid particles range from 0.7 μm to 780 μm.

14. The method of claim 1 wherein at least some of the solid particles are greater than 200 μm.

* * * * *